(12) United States Patent
Kwon et al.

(10) Patent No.: US 9,627,708 B2
(45) Date of Patent: *Apr. 18, 2017

(54) STEPPED ELECTRODE ASSEMBLY HAVING PREDETERMINED A THICKNESS RATIO IN THE INTERFACE BETWEEN ELECTRODE UNITS, BATTERY CELL AND DEVICE COMPRISING THE SAME

(71) Applicant: LG Chem, Ltd., Seoul (KR)

(72) Inventors: Sung-Jin Kwon, Daejeon (KR);
Soon-Ho Ahn, Seoul (KR);
Dong-Myung Kim, Daejeon (KR);
Ki-Woong Kim, Daejeon (KR);
Young-Hoon Kim, Daejeon (KR);
Sung-Han Yoon, Daejeon (KR);
Seung-Min Ryu, Chungcheongnam-do (KR)

(73) Assignee: LG Chem, Ltd. (KR)

( * ) Notice: Subject to any disclaimer, the term of this patent is extended or adjusted under 35 U.S.C. 154(b) by 311 days.

This patent is subject to a terminal disclaimer.

(21) Appl. No.: 14/497,493

(22) Filed: Sep. 26, 2014

(65) Prior Publication Data

US 2015/0010799 A1   Jan. 8, 2015

Related U.S. Application Data

(63) Continuation of application No. 14/079,164, filed on Nov. 13, 2013, now Pat. No. 8,945,743, which is a
(Continued)

(30) Foreign Application Priority Data

Apr. 20, 2012  (KR) .................. 10-2012-0041474
Nov. 7, 2012   (KR) .................. 10-2012-0125636
(Continued)

(51) Int. Cl.
*H01M 10/04* (2006.01)
*H01M 2/02* (2006.01)
(Continued)

(52) U.S. Cl.
CPC ..... *H01M 10/0413* (2013.01); *H01M 2/0202* (2013.01); *H01M 2/24* (2013.01);
(Continued)

(58) Field of Classification Search
CPC ........ H01M 2/02; H01M 2/0202; H01M 2/24; H01M 10/0463; H01M 10/0585;
(Continued)

(56) References Cited

U.S. PATENT DOCUMENTS 6,224,995 B1   5/2001   Fauteux et al.
6,258,478 B1   7/2001   Kim
(Continued)

FOREIGN PATENT DOCUMENTS

CN   1185860 A   6/1998
CN   1230035 A   9/1999
(Continued)

OTHER PUBLICATIONS

International Search Report for Application No. PCT/KR2013/002142 dated Jun. 21, 2013.
(Continued)

*Primary Examiner* — Kenneth Douyette
(74) *Attorney, Agent, or Firm* — Lerner, David, Littenberg, Krumholz & Mentlik, LLP

(57) ABSTRACT

There are provided an electrode assembly, and a battery cell, a battery pack, and a device. The electrode assembly includes a combination of two or more types of electrode units having different areas, wherein the electrode units are stacked such that steps are formed, and electrode units are
(Continued)

formed such that a positive electrode and a negative electrode face one another at an interface between the electrode units.

31 Claims, 7 Drawing Sheets

Related U.S. Application Data continuation of application No. PCT/KR2013/002142, filed on Mar. 15, 2013.

(30) Foreign Application Priority Data

| Nov. 9, 2012 | (KR) | ........................ 10-2012-0127013 |
| Feb. 8, 2013 | (KR) | ........................ 10-2013-0014722 |
| Mar. 15, 2013 | (KR) | ........................ 10-2013-0028288 |

(51) Int. Cl.

| *H01M 2/24* | (2006.01) |
| *H01M 10/0585* | (2010.01) |
| *H01M 10/0587* | (2010.01) |
| *H01M 10/0525* | (2010.01) |
| *H01M 10/0583* | (2010.01) |
| *H01M 4/02* | (2006.01) |
| *H01M 8/2465* | (2016.01) |
| *H01M 10/052* | (2010.01) |

(52) U.S. Cl.
CPC ... *H01M 10/0431* (2013.01); *H01M 10/0436* (2013.01); *H01M 10/0463* (2013.01); *H01M 10/0525* (2013.01); *H01M 10/0583* (2013.01); *H01M 10/0585* (2013.01); *H01M 10/0587* (2013.01); *H01M 8/2465* (2013.01); *H01M 10/052* (2013.01); *H01M 2002/0205* (2013.01); *H01M 2004/021* (2013.01); *H01M 2004/027* (2013.01); *H01M 2220/30* (2013.01); *Y02E 60/122* (2013.01); *Y02P 70/54* (2015.11); *Y02T 10/7011* (2013.01)

(58) Field of Classification Search
CPC ......... H01M 10/0587; H01M 10/0436; H01M 10/0431; H01M 10/0525
See application file for complete search history.

(56) References Cited

U.S. PATENT DOCUMENTS

| 8,945,743 B2 | 2/2015 | Kwon et al. |
| 2001/0005561 A1 | 6/2001 | Yamada et al. |
| 2002/0034691 A1 | 3/2002 | Segawa |
| 2002/0160258 A1 | 10/2002 | Lee et al. |
| 2004/0041537 A1 | 3/2004 | Ishida et al. |
| 2004/0172808 A1 | 9/2004 | Fraser et al. |
| 2004/0175621 A1 | 9/2004 | Iriyama et al. |
| 2005/0191545 A1 | 9/2005 | Bowles et al. |
| 2006/0062904 A1 | 3/2006 | West et al. |
| 2006/0115736 A1 | 6/2006 | Hashimoto et al. |
| 2007/0059599 A1 | 3/2007 | Rubino et al. |
| 2007/0196732 A1 | 8/2007 | Tatebayashi et al. |
| 2007/0218355 A1 | 9/2007 | Ryu et al. |
| 2009/0296442 A1 | 12/2009 | Chang et al. |
| 2010/0104930 A1 | 4/2010 | Kim et al. |
| 2010/0203384 A1 | 8/2010 | West et al. |
| 2010/0319187 A1 | 12/2010 | Kim et al. |
| 2011/0008656 A1 | 1/2011 | Tanahashi et al. |
| 2011/0183171 A1 | 7/2011 | Moon et al. |
| 2011/0183183 A1 | 7/2011 | Grady et al. |
| 2011/0287304 A1 | 11/2011 | Zinck et al. |
| 2012/0015236 A1 | 1/2012 | Spare |
| 2012/0107654 A1 | 5/2012 | Bhardwaj et al. |
| 2014/0120394 A1 | 5/2014 | Kwon et al. |
| 2014/0234682 A1 | 8/2014 | Kwon et al. |
| 2014/0255743 A1 | 9/2014 | Kwon et al. |

FOREIGN PATENT DOCUMENTS

| CN | 1537338 A | 10/2004 |
| CN | 2773917 Y | 4/2006 |
| CN | 101652893 A | 2/2010 |
| EP | 1032068 A2 | 8/2000 |
| JP | H03152881 A | 6/1991 |
| JP | H09213366 A | 8/1997 |
| JP | H09293536 A | 11/1997 |
| JP | H11214027 A | 8/1999 |
| JP | 2001028275 A | 1/2001 |
| JP | 2001043899 A | 2/2001 |
| JP | 2001167743 A | 6/2001 |
| JP | 2003523061 A | 7/2003 |
| JP | 2004-111219 A | 4/2004 |
| JP | 2006-173000 A | 6/2006 |
| JP | 2008159419 A | 7/2008 |
| JP | 2010135265 A | 6/2010 |
| JP | 2011-081931 A | 4/2011 |
| JP | 2012054003 A | 3/2012 |
| KR | 19990066181 | 8/1999 |
| KR | 1020030066960 A | 8/2003 |
| KR | 20080087686 A | 10/2008 |
| WO | 2012009423 A1 | 1/2012 |

OTHER PUBLICATIONS

International Search Report for Application No. PCT/KR2013/002140 dated Jun. 21, 2013.
Machine Translation of KR 20030066960, Chang et al., 8/14/2003.
Chinese Office Action for Application No. 201380001748.7 dated Aug. 1, 2014.
Supplemental Search Report from European Application No. 13 77 8081, dated Oct. 2, 2015.
Supplemental Search Report from European Application No. 13 77 7724, dated Aug. 27, 2015.
Machine Translation of: KR 20030066960, Jang, Aug. 14, 2003.
International Search Report for Application No. PCT/KR2013/010470 dated Feb. 26, 2014.
Written Opinion for PCT/KR2013/010470 mailed on Feb. 26, 2014.
Search report from European Application No. 13840138.5, dated Apr. 30, 2015.
U.S. Appl. No. 14/707,850, filed Aug. 5, 2015.

STEPPED ELECTRODE ASSEMBLY HAVING PREDETERMINED A THICKNESS RATIO IN THE INTERFACE BETWEEN ELECTRODE UNITS, BATTERY CELL AND DEVICE COMPRISING THE SAME

CROSS-REFERENCE TO RELATED APPLICATIONS

This application is a continuation of U.S. application Ser. No. 14/079,164, filed Nov. 13, 20143, now U.S. Pat. No. 8,945,743, which is a continuation of International Application No. PCT/KR2013/002142, filed Mar. 15, 2013, which claims the benefit of Korean Application Nos. 10-2012-0041474, filed Apr. 20, 2012, 10-2012-0125636, filed Nov. 7, 2012, 10-2012-127013, filed Nov. 9, 2012, 10-2013-0014722, filed Feb. 8, 2013, and 10-2013-0028288, filed Mar. 15, 2013 in the Korean Intellectual Property Office, the disclosures of which are incorporated herein by reference.

FIELD OF THE INVENTION

The present invention relates to an electrode assembly, and a battery cell and a device comprising the same, and more particularly, to an electrode assembly including a combination of two or more types of electrode units having different areas, in which the electrode units are stacked such that steps are formed, a positive electrode and a negative electrode face at an interface between the electrode units.

BACKGROUND OF THE INVENTION

Recently, due to the technological development of mobile devices and increasing demand therefor, demand for rechargeable batteries (or secondary batteries) has rapidly increased, and accordingly, a secondary lithium battery having high energy density and a high operating voltage, as well as excellent charge and life span characteristics has been widely used as an energy source of various electronic products as well as various mobile devices.

In general, a secondary lithium battery has a structure in which an electrode assembly and electrolyte are hermetically sealed within a battery case, and may be classified as a cylindrical battery, a prismatic battery, a pouch-type battery, or the like, according to appearance, and may be classified as a lithium ion battery, a lithium ion polymer battery, a lithium polymer battery, or the like, according to a type of electrolyte used therein. Due to the recent trend to reduce the size of mobile devices, demand for thin prismatic batteries and pouch-type batteries has been on the rise, and in particular, interest in easily deformable, lightweight pouch-type batteries has been increased.

An electrode assembly received in a battery case may be divided into a jelly-roll type electrode assembly (or a spirally-rolled type electrode assembly), a stacked-type electrode assembly, a stacked-and-folded-type electrode assembly (or a composite-type electrode assembly) according to the shape of the electrode assembly. In general, the jelly-roll type electrode assembly refers to an electrode assembly fabricated by coating an electrode active material on metal foil used as a current collector, pressing the same, cutting it into a band form having a desired width and length, partitioning a negative electrode and a positive electrode by using a separation film, and winding the same in a spiral manner. The stacked-type electrode assembly refers to an electrode assembly fabricating by stacking a negative electrode, a separator, and a positive electrode vertically. The stacked-and-folded-type electrode assembly refers to an electrode assembly fabricated by rolling or folding a continuous single layer of separator having one or more electrodes or electrode laminates comprised of negative electrode/separator/positive electrode by an elongated sheet type separation film.

However, the related art electrode assemblies known to date are generally fabricated in a manner of stacking unit cells or individual electrodes having the same size, degrading a degree of freedom in shape, to result in a great deal of design restrictions.

Thus, in order to realize various designs, methods of manufacturing a battery having a stepped portion by stacking electrodes having different sizes or unit cells have been proposed. However, batteries having a stepped portion, that have been proposed to date, are manufactured by a method in which positive electrode plates and negative electrode plates are cut to have desired areas to allow unit cells to have different areas and stacking the cut positive electrode plates and the cut negative electrode plates. At this time, since the area in each stepped portion is controllable but the thickness of the stepped portion is limited to multiples of the thickness of each stepped portion, the design freedom in designing the thickness direction of the batteries is limited.

Also, the above-described existing techniques only propose ideas that may change the design by cutting negative electrode plates and positive electrode plates to have desired sizes to form unit cells having different sizes, and stacking the cut negative electrode plates and the cut positive electrode plates, and do not propose a concrete method that may allow a battery having battery characteristics that are actually usable to be manufactured. For example, in the case of a battery having a stepped portion, although each unit cell constituting the battery and having a different size operates without error, it is common that the battery cannot actually be used, due to problems in which it is impossible to operate these batteries according to the configuration of unit cells constituting each stepped portion when the electrodes are stacked, battery capacitance is remarkably low compared to other batteries having the same volume, or severe swelling occurs at an interface between stepped portions, thus severely shortening product lifespan. However, these existing batteries having a stepped portion are not configured in consideration of the above-described problem.

Thus, there is a need for an electrode assembly capable of exhibiting large capacity characteristics while implementing various designs according to shapes of devices to which a battery cell is applied, and the development of a battery using the same are required.

SUMMARY OF THE INVENTION

An aspect of the present invention provides an electrode assembly capable of having various designs implemented therein, including several advantages such as, for example, being thinner, and having excellent electrical capacity characteristics, and an electric cell and device comprising the same.

According to an aspect of the present invention, there is provided an electrode assembly including a combination of two or more types of electrode units having different areas, in which the electrode units are stacked such that steps are formed, and electrode units are formed such that electrodes having different polarities, i.e., a positive electrode and a negative electrode, face one another at an interface between the electrode units having different areas.

According to an aspect of the present invention, the electrode assembly, subject to 500 charge and discharge cycles at 25° C., may have a level of electrical capacitance above 60% of that after a single charge and discharge cycle, and a total thickness variation ratio of the electrode assembly may not be greater than 15%. For this, the positive electrode and the negative electrode facing each other at the interface between the electrode units having different areas may be configured to be balanced with each other.

In one embodiment, at the interface between the electrode units having different areas, a negative electrode of an electrode unit having a relatively large area and a positive electrode of an electrode unit having a relatively small area may face one another. Thus, in the illustrated embodiments, it be noted that because the negative electrode at an interface between electrode units having different areas is larger than the adjacent positive electrode, a portion of the negative electrode will be exposed at the interface.

The electrode assembly according to an embodiment of the present invention may be configured to satisfy Equation 1:

$$N_n/P_n \leq N_n/P_{n+1},\qquad\text{Equation 1:}$$

where n is an integer not less than 1, $N_n$ is reversible capacitance per unit area of the negative electrode of the electrode unit that is the n-th largest in area, $P_n$ is a reversible capacitance per unit area of the positive electrode of the electrode unit that is the n-th largest in area, and $P_{n+1}$ is a reversible capacitance per unit area of the positive electrode of the electrode unit that is the (n+1)th largest in area.

When the electrode assembly according to an embodiment of the present invention includes three or more types of electrode unit having different areas, the electrode assembly may be configured to satisfy Equation 2:

$$N_n/P_n \leq N_n/P_{n+1} \leq N_{n+1}/P_{n+1} \leq N_{n+1}/P_{n+2},\qquad\text{Equation 2:}$$

where n is an integer not less than 1, $N_n$ is reversible capacitance per unit area of a negative electrode of the electrode unit that is the n-th largest in area, $N_{n+1}$ is reversible capacitance per unit area of a negative electrode of the electrode unit that is the (n+1)th largest in area, $P_n$ is reversible capacitance per unit area of a positive electrode of the electrode unit that is the n-th largest in area, $P_{n+1}$ is reversible capacitance per unit area of the positive electrode of the electrode unit that is the (n+1)th largest in area, and $P_{n+2}$ is reversible capacitance per unit area of a positive electrode of an electrode unit that is the (n+2)th largest in area.

When the electrode assembly according to an embodiment of the present invention includes three or more types of electrode unit having different areas, and the electrode unit that is the (n+2)th largest in area is disposed between the electrode unit that is the n-th largest in area and the electrode unit that is (n+1)th largest in area, the electrode assembly may be configured to satisfy Equation 3:

$$N_n/P_{n+2} \leq N_{n+1}/P_{n+2}\qquad\text{Equation 3}$$

where n is an integer not less than 1, $N_n$ is reversible capacitance per unit area of a negative electrode of the electrode unit that is the n-th largest in area, $N_{n+1}$ is reversible capacitance per unit area of a negative electrode of the electrode unit that is the (n+1)th largest in area, $P_{n+1}$ is reversible capacitance per unit area of the positive electrode of the electrode unit that is the (n+1)th largest in area, and $P_{n+2}$ is reversible capacitance per unit area of a positive electrode of an electrode unit that is the (n+2)th largest in area.

The electrode assembly according to an embodiment of the present invention may be configured to satisfy Equation 4:

$$dN_n/dP_n \leq dN_n/dP_{n+1}\qquad\text{Equation 4:}$$

where n is an integer not less than 1, $dN_n$ is a thickness of the negative electrode of the electrode unit that is the n-th largest in area, $dP_n$ is a thickness of the positive electrode of the electrode unit that is the n-th largest in area, and $dP_{n+1}$ is a thickness of the positive electrode of the electrode unit that is the (n+1)th largest in area.

When the electrode assembly according to an embodiment of the present invention includes three or more types of electrode unit having different areas, the electrode assembly may be configured to satisfy Equation 5:

$$dN_n/dP_n \leq dN_n/dP_{n+1} \leq dN_{n+1}/dP_{n+1} \leq dN_{n+1}/dP_{n+2}\qquad\text{Equation 5:}$$

where n is an integer not less than 1, $dN_n$ is a thickness of the negative electrode of the electrode unit that is the n-th largest in area, $dN_{n+1}$ is a thickness of the negative electrode of the electrode unit that is the (n+1)th largest in area, $dP_n$ is a thickness of the positive electrode of the electrode unit that is the n-th largest in area, $dP_{n+1}$ is a thickness of the positive electrode of the electrode unit that is the (n+1)th largest in area, and $dP_{n+2}$ is a thickness of the positive electrode of the electrode unit that is the (n+2)th largest in area.

When the electrode assembly according to an embodiment of the present invention includes three or more types of electrode unit having different areas, and the electrode unit that is the (n+2)th largest in area is disposed between the electrode unit that is the n-th largest in area and the electrode unit that is (n+1)th largest in area, the electrode assembly may be configured to satisfy Equation 6:

$$dN_n/dP_{n+2} \leq dN_{n+1}/dP_{n+2},\qquad\text{Equation 6:}$$

where n is an integer not less than 1, $dN_n$ is a thickness of the negative electrode of the electrode unit that is the n-th largest in area, $dN_{n+1}$ is a thickness of the negative electrode of the electrode unit that is the (n+1) th largest in area, $dP_{n+1}$ is a thickness of the positive electrode of the electrode unit that is the (n+1)th largest in area, and $dP_{n+2}$ is a thickness of the positive electrode of the electrode unit that is the (n+2)th largest in area.

In the electrode assembly according to an embodiment of the present invention including a positive electrode and a negative electrode facing each other at an interface between electrode units having different areas, the ratio of the thickness of the negative electrode to the thickness of the positive electrode may be in a range of about 0.5 to about 2, for example, within a range of about 0.6 to about 1.9, about 0.8 to about 1.5, or about 1.0 to about 1.5, and more concretely, may be about 1.0, about 1.1, about 1.2, about 1.3, or about 1.4.

In the electrode assembly according to an embodiment of the present invention including a positive electrode and a negative electrode facing each other at an interface between electrode units having different areas, the ratio of reversible capacitance per unit area of the negative electrode to the reversible capacitance per unit area of the positive electrode may be not less than about 1, for example, may be within a range of about 1 to about 2, about 1 to about 1.5, about 1 to about 1.2, about 1 to about 1.1, about 1.5 to about 2, about 1 to about 1.09, about 1.02 to about 1.2, about 1.02 to about 1.09, or about 1.05 to about 1.09, and more concretely, may be about 1.05, about 1.06, about 1.07, about 1.08, or about 1.09.

The electrode assembly according to an embodiment of the present invention includes a combination of three or more types of electrode units having different areas, and in this case, the ratios of the reversible capacitances per unit area of the negative electrodes to the reversible capacitances per unit area of the positive electrodes in the interface between the electrode units may be the same as each other or increase as the contact area between the electrode units is reduced.

Meanwhile, in an embodiment of the present invention, the electrode unit may include: one or more single electrodes; one or more unit cells including at least one positive electrode, at least one negative electrode, and at least one separator; or any combinations thereof. In this case, the unit cell may be selected from the group consisting of a jelly-roll type unit cell, a stacked-type unit cell, a laminated-and-stacked type unit cell and a stacked-and-folded-type unit cell. In the unit cell, polarities of two electrodes disposed on both outermost surfaces may be the same or different.

Also, preferably, the electrode assembly according to an embodiment of the present invention may have a structure in which some or all of the electrodes and the unit cells constituting the electrode units may be wrapped with a long sheet-type separation film.

Meanwhile, the electrode unit according to an embodiment of the present invention may have various sectional shapes. For example, a section of the electrode unit according to an embodiment of the present invention may have a quadrangular shape, a quadrangular-like shape with at least one corner having a curved shape, a trapezoid shape, or a shape with at least one or more sides having a curved shape.

Also, the electrode assembly according to an embodiment of the present invention may include a combination of electrode units having different sectional shapes or may include a combination of electrode units having the same sectional shape.

Meanwhile, the electrode units according to an embodiment of the present invention may include one or more electrode tabs, and in this case, the electrode tabs having the same polarity may be connected. In this case, the electrode tabs may have the same size, or may have different sizes according to areas of the electrode units.

Meanwhile, in the electrode assembly according to an embodiment of the present invention, two or more types of electrode units having different areas may be stacked in various arrangements. A method for stacking the electrode units may not be particularly limited. For example, the electrode units may be stacked to have an arrangement in which the areas of the electrode units are reduced upwardly, or conversely, the electrode units may be stacked to have an arrangement in which the areas of the electrode units are increased upwardly. Alternatively, the electrode units may be stacked such that an electrode unit having the largest area is arranged in a middle layer of the electrode assembly.

Also, in the electrode assembly according to an embodiment of the present invention, the electrode units may be stacked to have an arrangement in which central points of the respective electrode units in the plane direction are consistent, may be stacked to have an arrangement in which the central points of the respective electrode units in the plane direction are spaced apart at certain intervals, or may be stacked to have an arrangement in which one corners of the respective electrode units are consistent.

According to another aspect of the present invention, there is provided a battery cell in which the foregoing electrode assembly according to an embodiment of the present invention is installed in a battery case. Here, the battery case may be a pouch-type case, but the present invention is not limited thereto. Also, the battery case may be formed to have a shape corresponding to a shape of the electrode assembly. Also, the battery cell according to an embodiment of the present invention may be a lithium ion secondary battery or a lithium ion polymer secondary battery.

According to another aspect of the present invention, there is provided a device including one or more of the battery cells. A system component of the device may be positioned in surplus space within the battery cell. The device may be a portable phone, a portable computer, a smart phone, a smart pad, a net book, a light electronic vehicle (LEV), an electric vehicle, a hybrid electric vehicle, a plug-in hybrid electric vehicle, or a power storage device.

According to an embodiment of the present invention, an electrode assembly may have more various designs than the existing electrode assemblies by using combinations of two or more types of electrode units, and have commercially available electrical capacitance and durability characteristics.

Also, since an electrode assembly according to an embodiment of the present invention may achieve a balance between a positive electrode and a negative electrode at an interface between electrode units having different areas to relatively freely control thicknesses as well as areas of the electrode units constituting each stepped portion while maintaining the capacitance characteristic and the durability characteristic, the design freedom is very superior. As a result, a dead space which is generated due to a design factor when installing a device may be minimized to achieve superior space usability.

DETAILED DESCRIPTION OF THE PREFERRED EMBODIMENTS

Figure 1:
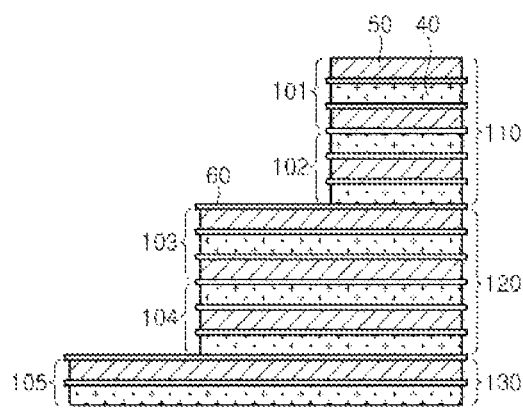
FIG. 1 is a side view of an electrode assembly according to a first embodiment of the present invention.

Hereinafter, embodiments of the present invention will be described in detail with reference to the accompanying drawings. However, drawings below are illustrative drawings provided to help understand the present invention merely as an embodiment of the present invention and the scope of the present invention is not limited thereto. Some components may be exaggerated, reduced, or omitted to easily understand the present invention.

An electrode assembly according to an embodiment of the present invention includes a combination of two or more types of electrode units having different areas, in which the electrode units are stacked such that steps are formed, and electrodes having different polarities, i.e., a positive electrode and a negative electrode, are formed to face at an interface between the electrode units having different areas.

Here, the 'area' refers to a surface area of the electrode units in a direction perpendicular to a direction in which the electrode units are stacked.

Also, the 'electrode unit' refers to a basic unit constituting one layer of the electrode assembly having steps according to an embodiment of the present invention, and each of the electrode units may include: electrodes such as a negative electrode or a positive electrode; one or more unit cells including at least one positive electrode, at least one negative electrode, and at least one separator, or a combination thereof.

Meanwhile, the term 'unit cell' is a concept including all of electrode laminates including at least one negative electrode, at least one positive electrode, and at least one separator, and a method for stacking a negative electrode, a positive electrode, and a separator in a unit cell is not particularly limited. For example, in an embodiment of the present invention, the term 'unit cell' may be understood to encapsulate a concept including all of an electrode laminate fabricated according to a jelly-roll scheme of partitioning a sheet-type negative electrode and a sheet-type positive electrode by using a separator and being wound in a spiral manner; an electrode laminate fabricated according to a stacking scheme of sequentially stacking one or more negative electrodes, one or more separators, and one or more positive electrodes; or an electrode laminate fabricated according to a stacking-and-folding scheme of disposing electrodes and/or electrode laminates formed by stacking one or more positive electrodes, separators, and negative electrodes, on an elongated sheet-type separation film, and folding the same.

Meanwhile, according to an embodiment of the present invention, in the unit cells like positive electrode/separator/negative electrode/separator/positive electrode, a negative electrode/separator/positive electrode/separator/negative electrode, the electrodes disposed on both outermost surfaces of the unit cell may have the same polarity, or like positive electrode/separator/negative electrode or positive electrode/separator/negative electrode/separator/positive electrode/separator/negative electrode, electrodes disposed on both outermost surfaces of the unit cell may have the opposite polarities.

Meanwhile, in the present invention, it should be understood that the electrode laminate manufactured in the stacked manner is a concept including an electrode laminate, manufactured by a method (hereinafter referred to as 'lamination and stacking method') of laminating at least positive electrode, at least one negative electrode, and at least one separator to form an electrode unit body and then stacking these electrode unit bodies as well as the electrode laminate, manufactured by a typical method of sequentially stacking a positive electrode, a separator, and a negative electrode.

Meanwhile, in the case in which an electrode laminate is manufactured by the lamination and stacking method, the electrode unit body may be used if it includes at least positive electrode, at least one negative electrode and at least one separator, and the configuration of the electrode unit body is not particularly limited.

However, from both points of view of process simplicity and economic feasibility, when an electrode laminate is manufactured by the lamination and stacking method, it is desirable that the electrode unit body be configured to include a basic structure comprised of a first electrode/separator/second electrode/separator or a separator/first electrode/separator/second electrode. In this regard, the first electrode and the second electrode may be a positive electrode and a negative electrode having opposing polarities, respectively, and the electrode unit body may include one or two or more basic structures.

Meanwhile, the electrode laminate, manufactured by the lamination and stacking method may only be comprised of an electrode unit body including the above-described basic structure, or may include a combination of an electrode unit body having the basic structure and an electrode structure body having a different structure.

Figure 14:
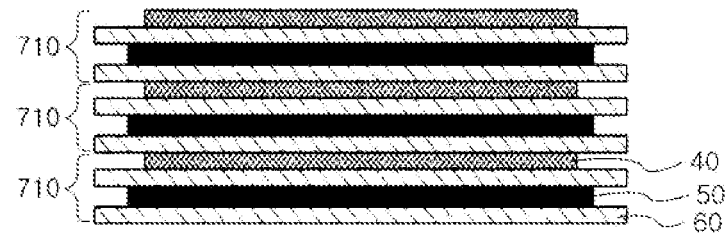
FIGS. 14 through 16 are schematic views illustrating implementation examples of laminated-and-stacked-type unit cells.
Figure 15:
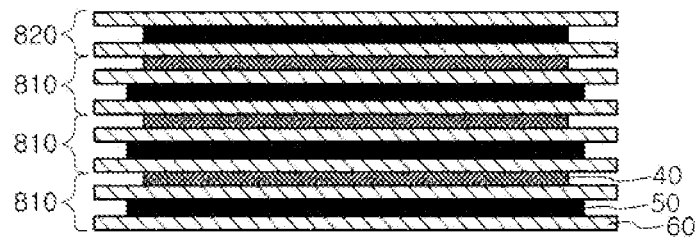
Figure 16:
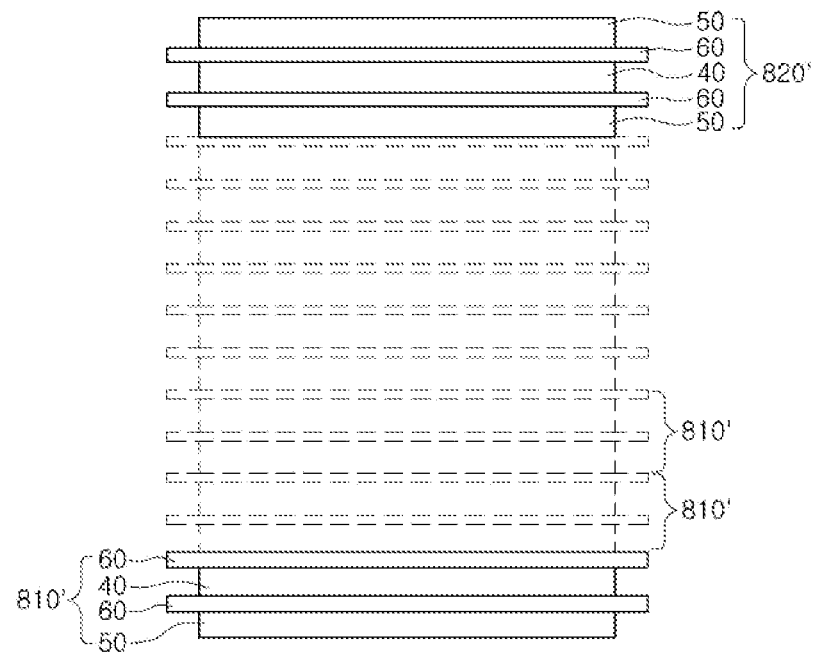

FIGS. 14 through 16 illustrate various examples of electrode laminate manufactured by the lamination and stacking method.

In FIG. 14, there is illustrated a laminated and stacked-type electrode laminate comprised of electrode unit bodies 710 having a basic structure of a separator 60/negative electrode 50/separator 60/positive electrode 40. While FIG. 14 illustrates the basic structure of a separator/negative electrode/separator/positive electrode, the positions of the positive electrode and the negative electrode may be exchanged with each other, thus providing a basic structure of a separator/positive electrode/separator/negative electrode. Meanwhile, as illustrated in FIG. 14, in the case in which the electrode unit body has the basic structure of a separator/negative electrode/separator/positive electrode, since the positive electrode may be exposed without the separator at the outermost side of the stacked electrode body, it may be desirable, in terms of an electrode design considering capacitance, to use a one surface-coated positive electrode in which an active material is not coated on the exposed surface of the outermost side, as the positive electrode. Meanwhile, while FIG. 14 illustrates that the electrode unit bodies have only one basic structure, the present invention is not limited thereto, and a configuration in which at least two basic structures are repeatedly stacked may be used as one electrode unit body.

In FIG. 15, there is illustrated an electrode laminate in which electrode unit bodies 810 having a basic structure of separator 60/negative electrode 50/separator 60/positive electrode 40, and an electrode structure body 820 having a structure of separator 60/negative electrode 50/separator 60 are stacked. When the electrode structure body having the structure of separator 60/negative electrode 50/separator 60 is stacked as illustrated in FIG. 15, the positive electrode 40 may be prevented from being exposed to the outside, and electrical capacitance may be increased. Similarly to this, in the case of a configuration in which a negative electrode is disposed at the outermost side of an electrode unit body, an electrode structure body comprised of separator/positive electrode/separator may be stacked thereon, so that the capacitance of the negative electrode may be used to the maximum.

In FIG. 16, there is illustrated an electrode laminate in which electrode unit bodies 810' having a basic structure of negative electrode 50/separator 60/positive electrode 40/separator 60, and an electrode structure body 820' having a structure of negative electrode 50/separator 60/positive electrode 40/separator 60/negative electrode 50 are stacked. When the electrode structure body 820' having the structure of negative electrode 50/separator 60/positive electrode 40/separator 60/negative electrode 50 is stacked on the outermost surface of the electrode laminate as illustrated in FIG. 16, the positive electrode may be prevented from being exposed to the outside, and electrical capacitance may be increased.

As illustrated in FIGS. 15 and 16, the electrode laminate which are manufactured by the lamination and stacking method may use combinations of a single electrode, a separator, or unit cells having different arrangements and configurations from the above-described electrode unit bodies, together with the electrode unit bodies having the above-described basic structure. In particular, when electrode unit bodies having the basic structure are stacked, in an aspect of preventing the positive electrode from being exposed to the outside and/or in an aspect of enhancing the battery capacitance, a single electrode, a one surface-coated electrode, a separator, or unit cells having different arrangement and configuration from the above-described unit bodies may be disposed on one outermost surface and/or both outermost surfaces of the electrode laminate. While FIGS. 15 and 16 illustrate that an electrode structure body having a different structure is arranged in upper side of electrode laminate, the present invention is not limited thereto, and if necessary, an electrode structure body having a different structure may be arranged in lower side of the electrode laminate, or electrode structure bodies having different structures may be arranged in both of upper side and lower side of electrode laminate.

Meanwhile, in an embodiment of the present invention, the term 'stacking and folding' generally refers to a method of disposing electrodes and/or electrode laminates formed by stacking one or more positive electrodes, separators, and negative electrodes on an elongated sheet-type separation film and folding the same. Here, the folding method is not particularly limited and the folding method should be understood to have a concept covering any folding methods well known in the art, e.g., a method of folding a sheet-type separation film in zigzags (known as a Z-folding type or a folding screen type), a method of disposing electrode laminates formed by stacking one or more negative electrodes and positive electrodes with a separator interposed therebetween on one surface of a sheet-type separation film, and winding and rolling the same, or a method of alternately disposing electrodes on both surfaces of a sheet-type separation film and winding and rolling the sheet-type separation film. In the present disclosure, a unit cell fabricated according to the jelly-roll method will be referred to as a jelly-roll-type unit cell, a unit cell fabricated according to the stacking method will be referred to as a stacked-type unit cell, and a unit cell fabricated according to the stacking-and-folding method will be referred to as a 'stacked-and-folded-type unit cell' for the purposes of description.

In the electrode assembly according to an embodiment of the present invention, two or more types of electrode units having different areas are stacked such that steps are formed, thus implementing batteries having various shapes in comparison to the related art. In an embodiment of the present invention, a difference in the areas of the electrode units may be as large as to form steps when the electrode units are stacked, and may be freely adjusted in consideration of a desired design of a battery, or the like, without being particularly limited. For example, in an implementation example of the present invention, when two electrode units included in the electrode assembly are compared, if an area of an electrode unit having a relatively large area is about 100%, an electrode unit having a relatively small area may have an area within a range of about 20% to about 95%, preferably, within an range of about 30% to about 90%.

Meanwhile, in the electrode assembly according to an embodiment of the present invention, thicknesses of the respective electrode units may be the same or different and are not particularly limited. For example, in an embodiment of the present invention, the electrode unit having a relatively large area may have a thickness smaller than that of the electrode unit having a relatively small area or may have a greater thickness.

Meanwhile, in the electrode assembly according to an embodiment of the present invention, since the electrodes having different polarities are disposed to face one another at the interface between the electrode units having different areas, electricity can be stored even at the interface between the electrode units, and as a result, electricity capacity is increased. In this case, 'facing' refers to a disposition in a facing direction, and in this case, two facing electrodes are not required to be in contact, and has a concept of including a case in which different components, e.g., a separator and/or a sheet-type separation film, may be interposed between two electrodes.

Meanwhile, preferably, the electrode assembly according to an embodiment of the present invention may be formed such that a negative electrode of an electrode unit having a larger area and a positive electrode of an electrode having a smaller area face at an interface between the two or more types of electrode units having different areas. This is because, if the positive electrode of the electrode unit having a larger area is disposed on the interface between the electrode units having different areas, lithium may be precipitated from the positive electrode of the electrode unit having a larger area to shorten a life span of a battery or degrade stability of the battery.

An electrode assembly according to an embodiment of the present invention includes electrode units having different areas, and may be realized in various manners by configuring the respective electrode units to be different from each other. It is, however, to be noted that it is difficult to manufacture an electrode assembly having commercially available capacitance and durability characteristics by only manufacturing electrode units having different areas from each other and stacking the manufactured electrode units, and the design freedom in the thickness direction is very limited because the thickness of the electrode unit is limited to being a multiple of a thickness of a unit cell or a unit electrode. Thus, the inventors have performed research into manufacturing an electrode assembly having commercially available power efficiency and structural stability while having excellent design freedom in the thickness direction, and have found that an electrode assembly, excellent in terms of capacitance, durability and design freedom in the thickness direction may be produced by controlling a balance at an interface between electrode units having different areas.

At this time, the balance at the interface between the electrode units having different areas is controlled refers to a positive electrode and a negative electrode facing one another at an interface between electrode units being designed so as to stably maintain power efficiency and battery stability, and may be achieved, for example, by controlling capacitances, thicknesses, or the like of the positive electrode and the negative electrode at the interface. More concretely, it is desirable to design a positive electrode and a negative electrode facing one another at an interface between electrode units such that an electrode assembly of the present invention, which has been subject to 500 charge and discharge cycles at 25° C., has an electrical capacitance of not less than 60% with respect to an electrical capacitance after a single charge and discharge cycle, and a total thickness variation ratio of the electrode assembly is not greater than 15%.

In this regard, the electrical capacitance refers to electrical capacitance measured under the following charging condition (A) and discharging condition (B). Meanwhile, a pause of 10 minutes is provided between charge and discharge cycles.

Charging condition (A): After a battery was charged to 4.25V or 4.35V in a constant current mode of 1 C, the constant current mode was converted to a constant voltage mode, and the charging was completed after current flowed until the amount of charge current became 1/20 of a minimum capacitance of the battery.

Discharging condition (B): A discharge current of 1 C flowed in the constant current mode, and the discharge was completed when the voltage reached 3V.

Meanwhile, the thickness variation ratio of the electrode assembly refers to (total thickness of the electrode assembly after 500 charge and discharge cycles/a total thickness of the electrode assembly after a single charge and discharge cycle)×100.

Meanwhile, after research, the inventors have found that the electrode units having different areas may be balanced at an interface therebetween through a design in which reversible capacitance per unit area of a negative electrode and a positive electrode facing each other at the interface between the electrode units having different areas satisfies a specific condition.

More concretely, when reversible capacitance per unit area of a negative electrode of an electrode unit that is the n-th largest in area is $N_n$, reversible capacitance per unit area of a negative electrode of an electrode unit that is the (n+1)th largest in area is $N_{n+1}$, reversible capacitance per unit area of a positive electrode of an electrode unit that is the n-th largest in area is $P_n$, and reversible capacitance per unit area of a positive electrode of an electrode unit that is the (n+1)th largest in area is $P_{n+1}$, an electrode assembly of the present invention may be formed such that the electrode assembly is configured to satisfy the following equation 1.

$$N_n/P_n \leq N_n/P_{n+1}, \quad \text{Equation 1:}$$

where n is an integer not less than 1.

In this regard, the reversible capacitance per unit area of the negative electrode refers to a value defined as a charge capacitance of the negative electrode per unit area [mAh/cm$^2$]×efficiency [%] of the negative electrode, the charge capacitance of the negative electrode per unit area refers to a value defined as a loaded amount [g/cm$^2$] of a negative electrode active material×a charge capacitance [mAh/g] per unit weight of the negative electrode, and the efficiency of the negative electrode refers to a value defined as (a ratio of a discharge capacitance of the negative electrode to the charge capacitance of the negative electrode)×100. Also, the reversible capacitance per unit area of the positive electrode refers to a value defined as a loaded amount [g/cm$^2$] of a positive electrode active material×a charge capacitance [mAh/g] per unit weight of positive electrode−an irreversible capacitance [mAh] per unit area of negative electrode.

Meanwhile, the loaded amount of negative electrode active material refers to the weight per unit area of the negative electrode active material coated on a negative electrode collector, and the loaded amount of the positive electrode active material refers to the weight per unit area of the positive electrode active material coated on a positive electrode collector. Also, the charge capacitances, the discharge capacitances, and the irreversible capacitances per unit weight of positive electrode and negative electrode may be measured by the following methods.

1) Charge Capacitance Per Unit Weight of Positive Electrode

After a positive electrode for evaluation is formed as a half cell, a counter electrode is formed of a lithium metal, the half cell is charged under the constant current of 0.1 C, and electrical capacitance is measured when an operating electrode potential reaches 4.25V. Then, the measured electrical capacitance is divided by the weight of an active material of the positive half cell to obtain the charge capacitance per unit weight of positive electrode.

2) Charge Capacitance Per Unit Weight of Negative Electrode

After a negative electrode for evaluation is formed as a half cell, a counter electrode is formed of a lithium metal, the half cell is charged under the constant current of 0.1 C, and electrical capacitance is measured when an operating electrode potential reaches 1.6V. Then, the measured electrical capacitance is divided by the weight of an active material of the negative half cell to obtain the charge capacitance per unit weight of negative electrode.

3) Discharge Capacitance Per Unit Weight of Negative Electrode

After a negative electrode for evaluation is formed as a half cell, a counter electrode is formed of a lithium metal, the half cell is charged under the constant current of 0.1 C, and after an operating electrode potential reaches 1.6V, the half cell is discharged under a constant current of 0.1 C, and electrical capacitance is measured when the operating electrode potential is 0V. Then, the measured electrical capacitance is divided by the weight of an active material of the negative half cell to obtain the charge capacitance per unit weight of negative electrode.

4) Irreversible Capacitance Per Unit Weight of Negative Electrode

A difference between the charge capacitance and the discharge capacitance which are measured with the above-described method is divided by the weight of the active material of the negative half cell to obtain the irreversible capacitance per unit weight of the negative electrode.

Meanwhile, according to the research of the inventors, in the case of an electrode assembly comprised of electrode units having different areas, although the respective electrode units are designed to operate normally, when the reversible capacitance ratio in the interface between the electrode units does not satisfy Equation 1, it is shown that it is difficult to implement commercially viable capacitance and durability characteristics in the electrode assembly. These results are not anticipated at all in existing electrode assemblies having the same area, and show that new elements that have not been considered in the course of manufacturing the existing electrode assemblies should be considered so as to allow an electrode assembly comprised of electrode units having different areas to be manufactured. Also, when Equation 1 is satisfied, since the thickness of each of the electrode units is relatively freely controllable within the defined range, design freedom in the thickness direction may be innovatively enhanced.

Meanwhile, when economic feasibility and energy density per volume are considered in the electrode assembly of the present invention, the electrode assembly according to an embodiment of the present invention may be configured to satisfy Equation 1-1, preferably to satisfy Equation 1-2.

However, the present invention is not limited to the above values.

$$1 \leq N_n/P_n \leq N_n/P_{n+1} \quad \text{Equation 1-1:}$$

$$1 \leq N_n/P_n \leq N_n/P_{n+1} \leq 1.2 \quad \text{Equation 1-2:}$$

In Equations 1-1 and 1-2, the definitions of n, $M_n$, $P_n$, and $P_{n+1}$ are the same as those in Equation 1.

Meanwhile, when an electrode assembly according to an embodiment of the present invention includes combinations of three or more types of electrode unit having different areas, the electrode assembly is preferably configured to satisfy Equation 2.

$$N_n/P_n \leq N_n/P_{n+1} \leq N_{n+1}/P_{n+1} \leq N_{n+1}/P_{n+2} \quad \text{Equation 2:}$$

In Equation 2, n is an integer not less than 1, $N_n$ is reversible capacitance per unit area of a negative electrode of the electrode unit that is the n-th largest in area, $N_{n+1}$ is reversible capacitance per unit area of a negative electrode of the electrode unit that is the (n+1)th largest in area, $P_n$ is reversible capacitance per unit area of a positive electrode of the electrode unit that is the n-th largest in area, $P_{n+1}$ is reversible capacitance per unit area of the positive electrode of the electrode unit that is the (n+1)th largest in area, and $P_{n+2}$ is reversible capacitance per unit area of a positive electrode of an electrode unit that is the (n+2)th largest in area.

Meanwhile, when economic feasibility and energy density per volume are considered in the electrode assembly of the present invention, the electrode assembly of the present invention is preferably configured to satisfy Equation 2-1.

$$1 \leq N_n/P_n \leq N_n/P_{n+1} \leq N_{n+1}/P_{n+1} \leq N_{n+1}/P_{n+2} \quad \text{Equation 2-1:}$$

$$1 \leq N_n/P_n \leq N_n/P_{n+1} \leq N_{n+1}/P_{n+1} \leq N_{n+1}/P_{n+2} \leq 1.2 \quad \text{Equation 2-2:}$$

In Equations 2-1 and 2-2, the definitions of n, $N_n$, $N_{n+1}$, $P_n$, and $P_{n+1}$ are the same as those in Equation 2.

Meanwhile, when an electrode assembly according to an embodiment of the present invention includes combinations of three or more types of electrode unit having different areas and the (n+2)th largest in area is disposed between the electrode unit that is the n-th largest in area and the electrode unit that is (n+1)th largest in area, the electrode assembly is more preferably configured to satisfy Equations 2 and 3 at the same time.

$$N_n/P_{n+2} \leq N_{n+1}/P_{n+2} \quad \text{Equation 3:}$$

In Equation 3, n is an integer not less than 1, Nn is reversible capacitance per unit area of a negative electrode of the electrode unit that is the n-th largest in area, Nn+1 is reversible capacitance per unit area of a negative electrode of the electrode unit that is the (n+1)th largest in area, $P_{n+1}$ is reversible capacitance per unit area of a positive electrode of the electrode unit that is the (n+1)th largest in area, and $P_{n+2}$ is reversible capacitance per unit area of a positive electrode of the electrode unit that is the (n+2)th largest in area. According to the research of the inventors, when the reversible capacitances of the positive electrode and the negative electrode included in the electrode assembly are designed to satisfy the above-described conditions, while the area and thickness of each electrode unit are changed variously, the electrode assembly having superior power efficiency and structural stability, that is, the electrode assembly in which the electrical capacitance when 500 charge and discharge cycles have been performed at 25° C. is 60% or more with respect to the electrical capacitance after a single charge and discharge cycle, and the total thickness variation ratio of the electrode assembly is 15% or less can be obtained.

Meanwhile, the electrode assembly according to an embodiment of the present invention may be designed such that the ratio of the reversible capacitance per unit area of the negative electrode to the reversible capacitance per unit area of the positive electrode is not less than 1, and preferably, about 1 to about 2, about 1 to about 1.5, about 1 to about 1.1, about 1 to about 1.09, about 1.5 to about 2, about 1.02 to about 1.09, about 1.05 to about 1.09, about 1.05, about 1.06, about 1.07, about 1.08 or about 1.09. According to the studies of the inventors, it is found that commercially available battery capacitance and durability may be obtained while the area, thickness, or the like of the electrode unit is relatively freely changed within a range satisfying that the ratio of the reversible capacitance per unit area of the negative electrode to the reversible capacitance per unit area of the positive electrode facing the negative electrode at an interface is 1 or more. However, when the ratio of the reversible capacitance per unit area of the negative electrode to the reversible capacitance per unit area of the positive electrode facing the negative electrode at an interface is less than 1, it is found that swelling is generated and thus battery stability and electrode efficiency are sharply reduced.

Meanwhile, in the case in which an electrode assembly of the present invention includes combinations of three or more types of electrode unit having different areas, the electrode assembly is designed such that the ratios of the reversible capacitances per unit area of the negative electrodes to the reversible capacitances per unit area of the positive electrodes in the interface between the electrode units are the same as each other or increase as the contact area between the electrode units is reduced. That is, in the case in which an electrode assembly includes an electrode unit (for convenience, referred to as first electrode unit) that has the largest area, an electrode unit (for convenience, referred to as second electrode unit) that has a medium area, and an electrode unit (for convenience, referred to as third electrode unit) that has the smallest area, it is desirable that the ratio of the reversible capacitances per unit area of the positive electrode and the negative electrode disposed in the interface between the second electrode unit and the third electrode unit is the same as or greater than the ratio of the reversible capacitances per unit area of the positive electrode and the negative electrode disposed in the interface between the first electrode unit and the second electrode unit. When the number of the electrode units having different areas increases, two or more interfaces between the electrode units are generated, and when balances in the two or more interfaces are not controlled, battery stability and performance may be reduced due to a structural deformation. According to the research of the inventors, in the case in which an electrode assembly includes combinations of three or more types of electrode unit having different areas, when the ratio of the reversible capacitances per unit area of the positive electrode and the negative electrode disposed in the interface between the electrode units is configured as described above, the reduction in battery stability and performance due to structural deformation may be suppressed as much as possible.

Meanwhile, another method of balancing the positive electrode and the negative electrode in the interface between the electrode units having different areas is to design the electrode assembly such that the ratio of thicknesses of the positive electrode and the negative electrode facing each other at the interface between the electrode units having different areas satisfies a specific range. For example, in the electrode assembly according to an embodiment of the present invention, the ratio (i.e., thickness of negative electrode/thickness of positive electrode) of the thickness of the negative electrode to the thickness of the positive electrode facing the negative electrode at the interface between the electrode units is in a range of about 0.5 to about 2, preferably, in a range of about 0.7 to about 1.8, and more preferably within a range of about 1.0 to about 1.4. When the ratio of the thicknesses of the negative electrode and the positive electrode facing each other at the interface between the electrode units is less than 0.5, sites in the negative electrode that may receive lithium ions of the positive electrode are deficient, and thus, lithium ions may be precipitated to exhibit low performance and low capacitance as compared to designed capacitance, and when the ratio exceeds 2, sites in the negative electrode that may receive lithium ions in an initial charge increase, so that the irreversible capacitance increases, an actual capacitance is low as compared to a designed capacitance, an excessive amount of negative electrode is used so that an energy density that is the efficiency of capacitance to battery density is lowered, a coating force is reduced, and a negative electrode active material may be delaminated.

Meanwhile, the thicknesses of the positive electrode and the negative electrode may be measured by cutting the electrode assembly using ion milling device (cross section polisher (CP)) to expose a section and scanning the exposed section using SEM equipment. At this time, the thicknesses of the positive electrode and the negative electrode indicate thicknesses including all of the electrode collector and the electrode coating portion. For example, in the case of a single-surface electrode in which an electrode coating portion is coated on a single surface of the electrode, the thickness of the electrode indicates a sum of thicknesses of the coating portion and the electrode collector, and in the case of a dual-surface electrode in which an electrode coating portion is coated on both surface of the electrode, i.e., in the case of an electrode comprised of coating portion/collector/coating portion, the thickness of the electrode indicates a sum of thicknesses of two coating portions and collector.

More concretely, an electrode assembly according to an embodiment of the present invention is preferably configured to satisfy Equation 4.

$$dN_n/dP_n \leq dN_n/dP_{n+1} \qquad \text{Equation 4:}$$

where n is an integer not less than 1, $dN_n$ is a thickness of the negative electrode of the electrode unit that is the n-th largest in area, $dP_n$ is a thickness of the positive electrode of the electrode unit that is the n-th largest in area, and $dP_{n+1}$ is a thickness of the positive electrode of the electrode unit that is the (n+1)th largest in area.

Meanwhile, when economic feasibility and energy density per volume are considered in the electrode assembly, the electrode assembly according to an embodiment of the present invention is preferably configured to satisfy Equation 4-1, more preferably, the electrode assembly may be configured to satisfy Equation 4-2, and most preferably, the electrode assembly may be configured to satisfy Equation 4-3.

$$0.5 \leq dN_n/dP_n \leq dN_n/dP_{n+1} \leq 2 \qquad \text{Equation 4-1:}$$

$$0.6 \leq dN_n/dP_n \leq dN_n/dP_{n+1} \leq 1.9 \qquad \text{Equation 4-2:}$$

$$1.0 \leq dN_n/dP_n \leq dN_n/dP_{n+1} \leq 1.5 \qquad \text{Equation 4-3:}$$

In Equations 4-1, 4-2, and 4-3, the definitions of $dN_n$, $dP_n$, and $dP_{n+1}$ are the same as those in Equation 4.

Meanwhile, in the case in which the electrode assembly according to an embodiment of the present invention includes three or more types of electrode unit having different areas, the electrode assembly may be configured to satisfy Equation 5.

$$dN_n/dP_n \leq dN_n/dP_{n+1} \leq dN_{n+1}/dP_{n+1} \leq dN_{n+1}/dP_{n+2} \qquad \text{Equation 5:}$$

where n is an integer not less than 1, $dN_n$ is a thickness of the negative electrode of the electrode unit that is the n-th largest in area, $dN_{n+1}$ is a thickness of the negative electrode of the electrode unit that is the (n+1)th largest in area, $dP_n$ is a thickness of the positive electrode of the electrode unit that is the n-th largest in area, $dP_{n+1}$ is a thickness of the positive electrode of the electrode unit that is the (n+1)th largest in area, and $dP_{n+2}$ is a thickness of the positive electrode of the electrode unit that is the (n+2)th largest in area.

Meanwhile, when economic feasibility and energy density per volume are considered in the electrode assembly, the electrode assembly according to an embodiment of the present invention may be preferably configured to satisfy Equation 5-1, more preferably, the electrode assembly may be configured to satisfy Equation 5-2, and most preferably, the electrode assembly may be configured to satisfy Equation 5-3.

$$0.5 \leq dN_n/dP_n \leq dN_n/dP_{n+1} \leq dN_{n+1}/dP_{n+1} \leq dN_{n+1}/dP_{n+2} \leq 2 \qquad \text{Equation 5-1:}$$

$$0.6 \leq dN_n/dP_n \leq dN_n/dP_{n+1} \leq dN_{n+1}/dP_{n+1} \leq dN_{n+1}/dP_{n+2} \leq 1.9 \qquad \text{Equation 5-2:}$$

$$1.0 \leq dN_n/dP_n \leq dN_n/dP_{n+1} \leq dN_{n+1}/dP_{n+1} \leq dN_{n+1}/dP_{n+2} \leq 1.5 \qquad \text{Equation 5-3:}$$

In Equations 5-1, 5-2, and 5-3, the definitions of $dN_n$, $dN_{n+1}$, $dP_n$, and $dP_{n+1}$ are the same as those in Equation 5.

Also, in the case in which an electrode assembly of the present invention includes three or more types of electrode unit having different areas, and the electrode unit that is the (n+2)th largest in area is disposed between the electrode unit that is the n-th largest in area and the electrode unit that is (n+1)th largest in area, the electrode assembly according to an embodiment of the present invention is preferably configured to satisfy Equations 5 and 6 at the same time.

$$dN_n/dP_{n+2} \leq dN_{n+1}/dP_{n+2}, \qquad \text{Equation 6:}$$

In Equation 6, n is an integer not less than 1, and $dN_n$ is the thickness of a negative electrode of an electrode unit that is the n-th largest in area, $dN_{n+1}$ is the thickness of a negative electrode of an electrode unit that is the (n+1)th largest in area, $dP_{n+1}$ is the thickness of a positive electrode of the electrode unit that is the (n+1)th largest in area, and $dP_{n+2}$ is the thickness of a positive electrode of an electrode unit that is the (n+2)th largest in area.

As above, the method of controlling the thicknesses of the positive electrode and the negative electrode in the interface between the electrode units is advantageous in that it is simple in design, as compared to the method of controlling the ratio of the reversible capacitances. However, in the case in which the specification of a used electrode is changed according to the electrode unit, the positive electrode and the negative electrode may not only be balanced by the ratio of the thicknesses. Therefore, in such a case, it is desirable that the electrode assembly is designed according to the method of controlling the ratio of the reversible capacitances of the positive electrode and the negative electrode. However, when the specifications of electrodes used in each electrode unit are the same as each other, or when the specifications of electrodes are different but the charge capacitance of a negative electrode active material is about 1.5 to 3 times, preferably about 1.8 to 2.5 times greater than the charge capacitance of a positive electrode active material, the positive electrode and the negative electrode may be easily balanced at the interface between the electrode units by designing the thicknesses of the positive electrode and the negative electrode in the above-described ranges.

Meanwhile, each of the positive electrodes and each of the negative electrodes included in an electrode assembly according to an embodiment of the present invention are designed to be balanced at the interface between the electrode units, and the thickness, the porosity, and the loaded amount of the coating portion of each of the electrodes are not particularly limited.

For example, the thicknesses of the positive electrode and the negative electrode included in the electrode assembly according to an embodiment of the present invention may be properly selected in consideration of the type of the electrode active material used, the battery capacitance for realization, and the like. For example, in the electrode assembly according to an embodiment of the present invention, the thickness of the positive electrode may be within a range of about 50 μm to about 150 μm, about 80 μm to about 140 μm, or about 100 μm to about 150 μm, and the thickness of the negative electrode may be within a range of about 80 μm to about 200 μm, about 100 μm to about 200 μm, or about 100 μm to about 150 μm.

Also, in the positive electrode and the negative electrode included in the electrode assembly according to an embodiment of the present invention, the coated amount (may be referred to as loaded amount) per unit area is not particularly limited, and may be properly selected in consideration of the type of the electrode active material used, the battery capacitance for realization, and the like. For example, in the present invention, the coated amount per unit area of the positive electrode active material may be within a range of about 10 mg/cm$^2$ to about 30 mg/cm$^2$, about 10 mg/cm$^2$ to about 25 mg/cm$^2$, or about 15 mg/cm$^2$ to about 30 mg/cm$^2$, and the coated amount per unit area of the negative electrode active material may be within a range of about 5 mg/cm$^2$ to about 20 mg/cm$^2$, about 5 mg/cm$^2$ to about 15 mg/cm$^2$, or about 10 mg/cm$^2$ to about 20 mg/cm$^2$.

Also, in the positive electrode and the negative electrode, the porosity is not particularly limited, and may be properly selected according to the type of the electrode active material used, the battery capacitance for realization, and the like. For example, in the present invention, the porosity of the positive electrode may be within a range of about 10% to about 30%, about 15% to about 30%, or about 10% to about 25%, and the porosity of the negative electrode may be within a range of about 15% to about 50%, about 20% to about 50%, or about 15% to about 40%.

According to the research of the inventors, when the thicknesses of the positive electrode and the negative electrode included in the electrode assembly are designed to satisfy the above-described conditions, while the area and/or thickness of each electrode unit are/or changed variously, the electrode assembly having superior power efficiency and structural stability, that is, the electrode assembly in which the electrical capacitance when 500 charge and discharge cycles have been performed at 25° C. is 60% or more with respect to the electrical capacitance after a single charge and discharge cycle, and the total thickness variation ratio of the electrode assembly is 15% or less can be obtained.

Meanwhile, the electrode units included in the electrode assembly according to an embodiment of the present invention may be combined variously. Hereinafter, a configuration of an electrode unit according to an embodiment of the present invention will be described in detail with reference to the accompanying drawings. FIGS. 1 through 4 illustrate various embodiments showing configurations of electrode units in the electrode assembly according to an embodiment of the present invention.

FIG. 1 illustrates an electrode assembly including an electrode assembly including electrode units comprised of stacked-type unit cells. As illustrated in FIG. 1, the electrode assembly according to an embodiment of the present invention may include three types of electrode units 110, 120, and 130 having different areas, and in this case, the electrode units may include stacked-type unit cells formed by stacking a positive electrode 40, a negative electrode 50 with a separator 60 interposed therebetween. In this case, the respective electrode units may be configured as a single unit cell 105 like the electrode unit 130 or may be configured as a combination of two or more unit cells 101 and 102 and 103 and 104 having the same area like the electrode unit 110 and the electrode unit 120. Meanwhile, in FIG. 1, the case in which all the unit cells constituting the electrode units are stacked-type unit cells is illustrated, but the present invention is not limited thereto. Namely, in an embodiment of the present invention, the electrode unit may be comprised of a jelly roll-type unit cell, a stacked-and-folded unit cell, besides the stacked-type unit cell, may be comprised of a combination of these unit cells and electrodes, and a combination of different types of unit cells.

Figure 2:
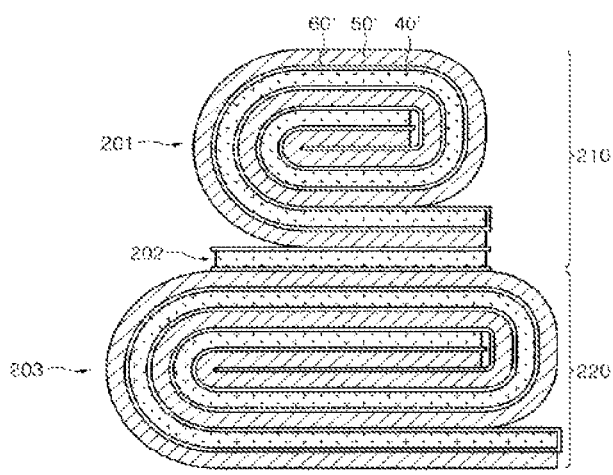
FIG. 2 is a side view of an electrode assembly according to a second embodiment of the present invention.

For example, FIG. 2 illustrates an electrode assembly including electrode units comprised of a jelly roll-type unit cell and a electrode. As illustrated in FIG. 2, the electrode assembly according to an embodiment of the present invention may include, for example, two or more types of electrode units 210 and 220 having different areas, and in this case, the electrode unit 210 having a relatively small area may be comprised of a jelly roll-type unit cell 201 and a single electrode 202, and the electrode unit 220 having a relatively large area may be comprised of a jelly roll-type unit cell 203. In this case, the jelly roll-type unit cells 201 and 203 are formed by winding a negative electrode sheet 50' and a positive electrode sheet 40' with a separator 60' interposed therebetween. In this case, in consideration of battery stability, the winding is performed such that the negative electrode sheet is positioned on an outer side, and the single electrode 202 is a positive electrode. However, the present invention is not limited thereto and a jelly roll-type unit cell formed by winding such that the positive electrode sheet is positioned at an outer side may be used, and in this case, an exposed portion includes an uncoated portion in which a positive electrode active material is not coated.

Meanwhile, FIG. 2 illustrates the electrode unit comprised of a combination of the jelly roll-type unit cell and the single electrode and the electrode unit comprised of a single jelly roll-type unit cell, but the present invention is not limited thereto and a electrode unit may be configured by combining a stacked-type unit cell and/or a stacked-and-folded-type unit cell with a single electrode, or a electrode unit may be configured by combining two or more types of unit cells.

Figure 3:
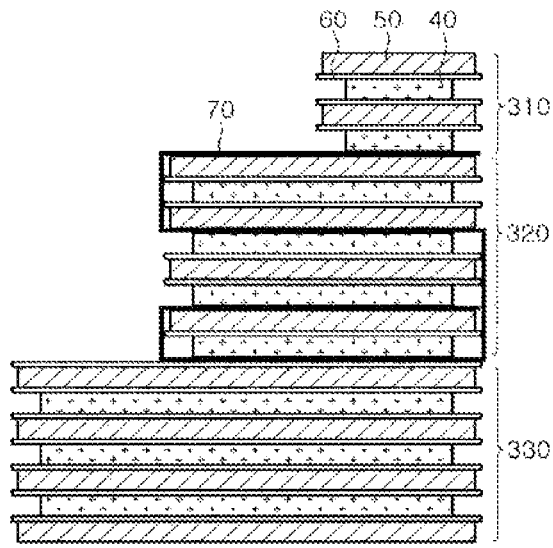
FIG. 3 is a side view of an electrode assembly according to a third embodiment of the present invention.

For example, as illustrated in FIG. 3, the electrode assembly according to an embodiment of the present invention may be implemented by combining a stacked-type unit cell and stacked-and-folded type unit cells. As illustrated in FIG. 3, the electrode assembly according to an embodiment of the present invention may include three types of electrode units 310, 320, and 330 having different areas, and in this case, the electrode unit 310 having the smallest area and the electrode unit 330 having the largest area may be comprised of stacked-type unit cells, and the electrode unit 320 having a middle area may be comprised of stacked-and-folded-type unit cells. Among these, the electrode unit 310 having the smallest area may be comprised of a stacked-type unit cell having a structure of a negative electrode 50/separator 60/positive electrode 40/separator 60/negative electrode 50/separator 60/positive electrode 40, and the electrode unit 330 having the largest area may be comprised of a stacked-type unit cell having a structure of a negative electrode 50/separator 60/positive electrode 40/separator 60/negative electrode 50/separator 60/positive electrode 40/separator 60/negative electrode 50. In this manner, the electrodes disposed on both outermost surfaces of the unit cell may be different or may be the same, and a single unit cell may include one or more positive electrodes and/or one or more negative electrodes. Meanwhile, the electrode unit 320 having a middle area may be comprised of a stacked-and-folded-type unit cell formed by stacking electrode laminates including a negative electrode, a positive electrode, and a separator wound by a sheet-type separation film 70.

Figure 4:
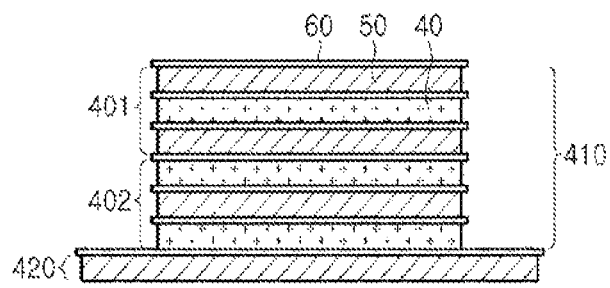
FIG. 4 is a side view of an electrode assembly according to a fourth embodiment of the present invention.

Meanwhile, FIG. 4 illustrates an example of an electrode unit configured as a single electrode. As illustrated in FIG. 4, the electrode assembly according to an embodiment of the present invention may include an electrode unit 420 configured as a single electrode and an electrode unit 410 comprised of one or more unit cells 401 and 402.

As above, in the electrode assembly according to an embodiment of the present invention, the single electrode unit may be configured as a single electrode, one or more unit cells, or a combination thereof, and in this case, various unit cells, e.g., a stacked-type unit cell, a jelly roll-type unit cell, a stacked-and-folded-type unit cell and/or a combination thereof generally used in the art may be used as the foregoing unit cells without limitation. Meanwhile, besides the unit electrodes illustrated in FIGS. 1 through 4, combinations of various electrode units may exist, and such modifications may be understood to be included in the scope of the present invention.

Figure 5:
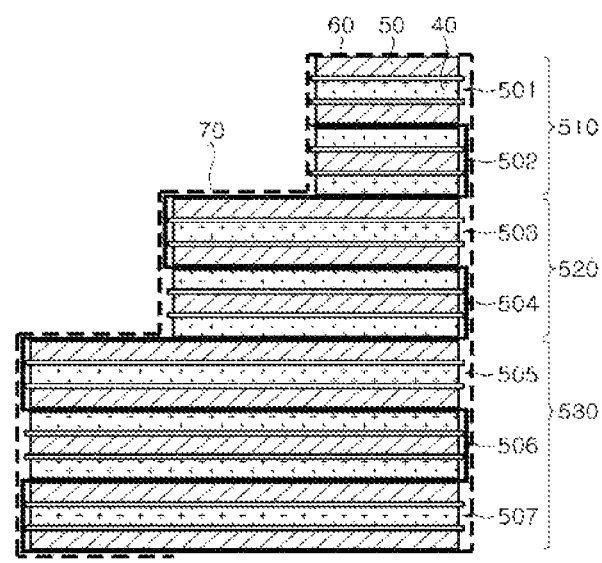
FIG. 5 is a side view of an electrode assembly according to a fifth embodiment of the present invention.

Meanwhile, the electrode assembly according to an embodiment of the present invention may have a structure in which some or all of single electrodes and the unit cells constituting electrode units are wrapped with a single sheet-type separation film. FIG. 5 illustrates an implementation example of the electrode assembly having a structure in which some or all of single electrodes and unit cells constituting electrode units are covered by a sheet-type separation film. As illustrated in FIG. 5, the unit cells 501, 502, 503, 504, 505, 506, and 507 constituting electrode units 510, 520, and 530 are covered with the sheet-type separation film 70, battery expansion is restrained by the sheet-type separation film 70, improving battery stability. Meanwhile, in FIG. 5, the sheet-type separation film may not be present in the portion indicated by the dotted line.

Meanwhile, FIG. 5 illustrates that the sheet-type separation film covers the unit cells 501, 502, 503, 504, 505, 506, 507 in a zigzag manner, but the present invention is not limited thereto and the method of winding a single electrode and/or unit cells with a sheet-type separation film may be variously implemented.

Figure 6:
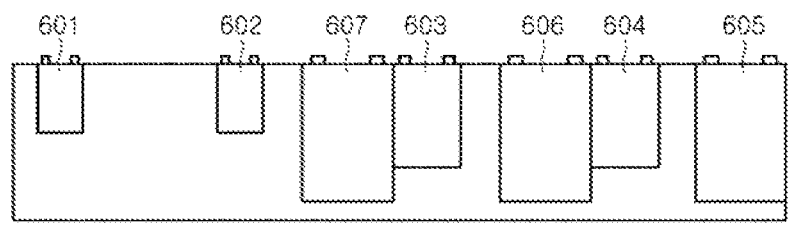
FIG. 6 is a deployment view of an electrode assembly according to a sixth embodiment of the present invention.

For example, as illustrated in FIG. 6, an electrode assembly according to an embodiment of the present invention may be fabricated by arranging unit cells 601, 602, 602, 603, 604, 605, 606, and 607 having different areas at appropriate intervals on the sheet-type separation film 70, and rolling the sheet-type separation film 70.

Also, although not shown, an electrode assembly according to an embodiment of the present invention may be fabricated by arranging positive electrodes at certain intervals on one surface of the sheet-type separation film, arranging negative electrodes at certain intervals on the opposite surface, and subsequently rolling the sheet-type separation film. Or, an electrode assembly according to an embodiment of the present invention may be fabricated by preparing two sheet-type separation films, stacking negative electrodes in a certain arrangement on one sheet-type separation film, stacking positive electrodes in a certain arrangement on the other sheet-type separation film, and subsequently rolling the two sheet-type separation films. Besides, there may be various methods for wrapping some or all of the electrode units by using a sheet-type separation film according to a shape, or the like, of an electrode assembly desired to be fabricated, and it should be appreciated that such modifications belong to the scope of the present invention.

Meanwhile, a material of the positive electrode, the negative electrode, and the separator included in the electrode assembly according to an embodiment of the present invention is not particularly limited, and positive electrodes, negative electrodes, and separators known in the art may be used without limitation. For example, the negative electrode may be formed by coating a negative electrode active material such as a lithium metal, a lithium alloy, carbon, petroleum cork, activate carbon, graphite, a silicon compound, a tin compound, a titanium compound, an alloy thereof, or the like, on a negative electrode current collector made of copper, nickel, aluminum, or an alloy including one or more types thereof. Also, the positive electrode may be formed by coating a positive electrode active material such as a lithium manganese oxide, a lithium cobalt oxide, a lithium nickel oxide, a lithium iron phosphate, or a compound and a mixture including one or more thereof on a positive electrode current collector made of aluminum, nickel, copper, or a combination including one or more types thereof. In this case, the areas of the positive electrode and negative electrode constituting a single unit cell in which the electrode active material is coated may be the same or different. For example, the unit cells of FIG. 1 show the case in which the areas of the negative electrode and the positive electrode coated with the electrode active material are the same, and the unit cells of FIG. 3 show a case in which the areas of the negative electrode and the positive electrode coated with the electrode active material are different. Also, the electrode active material may be coated on both surfaces of the current collector or may be coated only on one surface of the current collector in order to form an uncoated portion, or the like.

Meanwhile, the separator may be a multi-layer film made of polyethylene, polypropylene, or a combination thereof having a micro-porous structure, or a polymer film for a gel-type polymer electrolyte or a solid polymer electrolyte such as polyvinylidene fluoride, polyethylene oxide, polyacrylonitrile, or polyvinylidene fluoride hexafluoropropylene copolymer may be used, but the present invention is not particularly limited.

Also, in the electrode assembly according to an embodiment of the present invention, the electrode units may have one or more electrode tabs. In general, when the electrode unit is configured as a single electrode (e.g., 420 in FIG. 4), it may have only one electrode tab, and when the electrode unit is configured to include a unit cell, it may include both a negative electrode tab and a positive electrode tab. The electrode tabs having the same polarity are electrically connected. Meanwhile, in an embodiment of the present invention, an area, an arrangement position, and the like, of the electrode tabs are not particularly limited.

For example, the areas of the electrode tabs provided in the respective electrode units may be the same or different. In the related art, since the areas of the electrode units included in an electrode assembly are the same, electrode tabs having the same area are generally used. In comparison, in the case of the present invention, since two or more types of electrode units having different areas are included, the sizes of electrode tabs optimized in every electrode unit may be different. Thus, in the electrode assembly according to an embodiment of the present invention, it may be more advantageous to select electrode tabs having different areas according to the areas of electrode unit in order to maximize electrical capacity.

Also, in an embodiment of the present invention, the electrode tabs may be disposed in various positions. For example, the electrode tabs may be disposed such that some or all of the electrode tabs having the same polarity overlap with each other. In the case of the related art electrode assembly, generally, the electrode tabs having the same polarity are all disposed to overlap with each other in order to facilitate electrical connection of the electrode tabs after being inserted into a battery case. In this case, however, if the number of stacked electrodes is increased, the thickness of the electrode tabs is increased to degrade bondability between the electrode tabs. When the electrode tabs are disposed such that only some, rather than all, of them overlap with each other, the foregoing problem can be considerably reduced.

Figure 7:
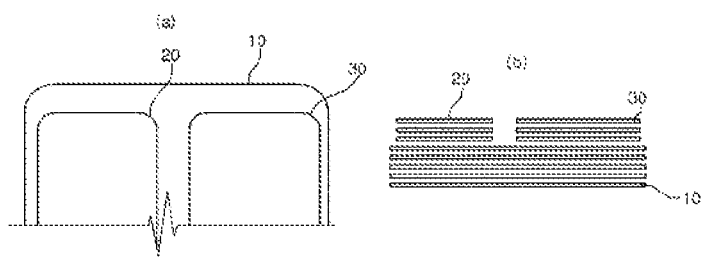
FIG. 7 is a view illustrating a configuration of electrode tabs according to an embodiment of the present invention.

In particular, when two or more types of electrode units having different areas are used like the electrode assembly according to an embodiment of the present invention, electrode tabs having different areas may be used according to areas of electrode unit and are arranged such that only some thereof overlap with each other to enhance bondability of the electrode tabs while maximizing electrical capacity. FIG. 7 illustrates an implementation example of electrode tabs that may be applicable to the electrode assembly according to an embodiment of the present invention. As illustrated in FIG. 7, in the electrode assembly according to an embodiment of the present invention, electrode tabs 10, 20, and 30 having different areas are used according to electrode units, and may be arranged such that only some thereof overlap with each other.

Shapes of the electrode units according to an embodiment of the present invention may be the same or different. For example, the electrode units according to an embodiment of the present invention may have a quadrangular shape such as a rectangular shape, a square shape, a trapezoid shape, a parallelogram shape, a diamond-like shape, or the like, or may have a quadrangular-like shape with chamfered corners or rounded corners, or may have a shape in which one or more sides are configured as curved lines. Besides, electrode units having various other shapes may exist, and it should be appreciated that such modifications belong to the scope of the present invention.

Figure 10:
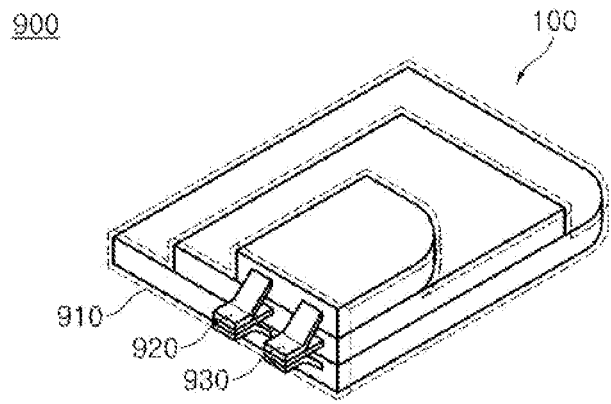
FIG. 10 is a perspective view of a battery cell according to another embodiment of the present invention.

Meanwhile, the electrode assembly according to an embodiment of the present invention may be formed by stacking electrode units having the same shape, or may be formed by combining electrode units having different shapes as illustrated in FIG. 10. In this manner, since the electrode units are formed to have various shapes, battery designs having various shapes can be implemented and space utilization can be enhanced.

Figure 8:
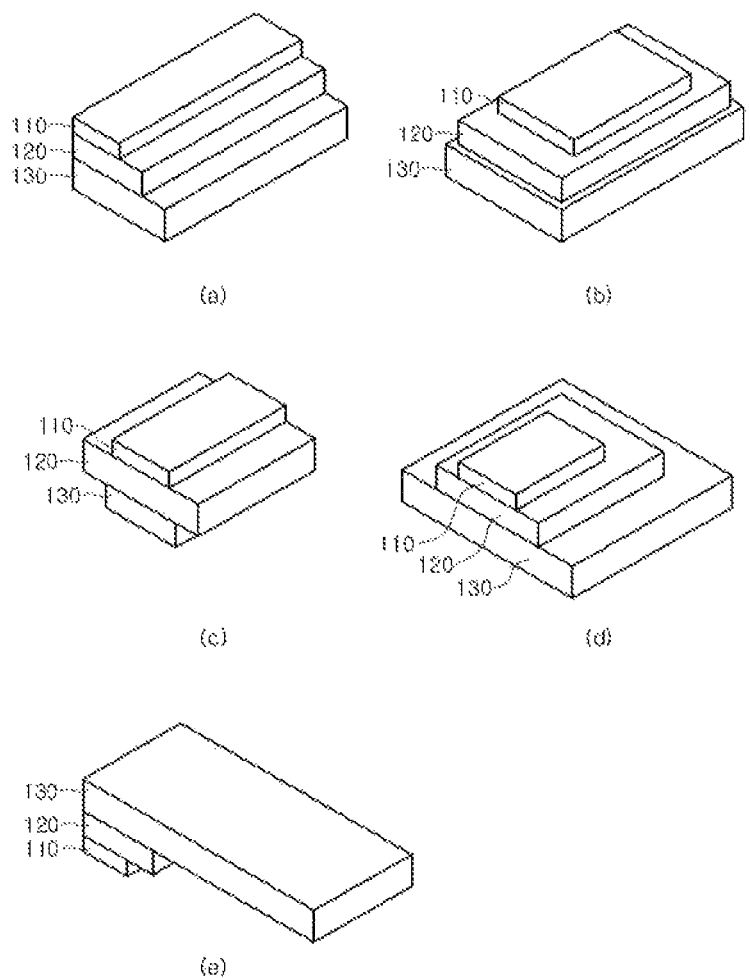
FIG. 8 is a view illustrating an example of stacking electrode units according to an embodiment of the present invention.

Meanwhile, in the electrode assembly according to an embodiment of the present invention, two or more types of electrode units having different areas may be stacked to have various arrangements. A method for stacking electrode units is not particularly limited. For example, as illustrated in FIGS. 8(A), (B), and (D), the electrode units may be stacked to have an arrangement in which the areas of the electrode units are reduced from a lower side to an upper side (or upwardly). As shown in FIG. 8(E), the electrode units may be stacked to have an arrangement in which the areas of the electrode units are increased from the lower side to the upper side. Also, as shown in FIG. 8(C), the electrode units may be stacked such that the electrode unit having the largest area is arranged in a middle layer of the electrode assembly.

Also, in the electrode assembly according to an embodiment of the present invention, for example, as shown in FIG. 8(A), the electrode units may be stacked to have a stepwise arrangement in which one corner of each of the respective electrode units is consistent. As illustrated in FIG. 8(B), the electrode units may be stacked to have a pyramid-type arrangement in which the central points of the respective electrode units in a planar direction are consistent. Also, as illustrated in FIG. 8(D), the electrode units may be stacked to have an arrangement in which the central points of the respective electrode units in the planar direction are separated at certain intervals or irregularly. Besides, the stacking arrangement may be variously modified, and it should be appreciated that such various modifications belong to the scope of the present invention.

Figure 9:
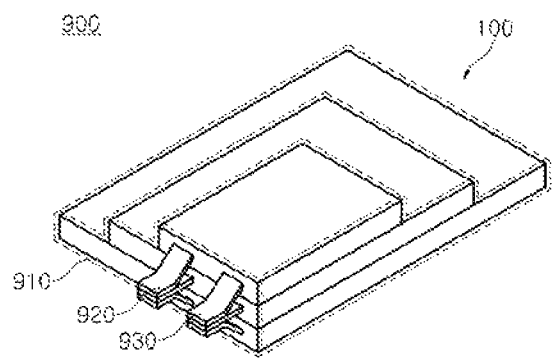
FIG. 9 is a perspective view of a battery cell according to an embodiment of the present invention.

Hereinafter, a battery cell according to an embodiment of the present invention will be described. FIGS. 9 and 10 illustrate a battery cell according to an embodiment of the present invention. As illustrated in FIGS. 9 and 10, in a battery cell 900 according to an embodiment of the present invention, the electrode assembly 100 according to an embodiment of the present invention is installed in a battery case 910.

In this case, the battery case 910 may be a pouch-type case and may have a shape corresponding to that of the electrode assembly, but the present invention is not limited thereto.

Meanwhile, the pouch-type case may be made of a laminate sheet and, in this case, the laminate sheet may include an outer resin layer forming the outermost portion, a blocking metal layer preventing penetration of a material, and an inner resin layer for hermetical sealing, but the present invention is not limited thereto.

Also, the battery case may have a structure in which electrode leads 920 and 930 for electrically connecting electrical terminals of the electrode units of the electrode assembly are exposed to the outside. Although not shown, an insulating film may be attached to upper and lower surfaces of the electrode leads 920 and 930 in order to protect the electrode leads 920 and 930.

Also, the battery case may have a shape corresponding to a shape of the electrode assembly. The shape of the battery case may be formed by deforming the battery case itself. In this case, the shape and size of the battery case may not necessarily correspond to the shape and size of the electrode assembly. Namely, battery case may have a shape and size sufficient to prevent an internal short circuit due to a thrust phenomenon. Meanwhile, the shape of the battery case is not limited thereto and battery cases having various shapes and sizes may be used as necessary.

The battery cell 100 according to an embodiment of the present invention may be a lithium ion battery or a lithium ion polymer battery, but the present invention is not limited thereto.

The battery cell 100 according to an embodiment of the present invention may be used alone or a battery pack including one or more battery cells 100 may be used. The battery cell and/or the battery pack according to an embodiment of the present invention may be advantageously used in various devices, for example, a portable phone, a portable computer, a smart phone, a smart pad, a net book, a light electronic vehicle (LEV), an electric vehicle, a hybrid electric vehicle, a plug-in hybrid electric vehicle, a power storage device, and the like. The structures of these devices and fabrication methods thereof are known in the art, so a detailed description thereof will be omitted.

Meanwhile, when the battery cell or the battery pack is installed in the foregoing devices, a system component of the devices may be positioned in a surplus space formed due to the structure of the battery cell or the battery pack. In an embodiment of the present invention, since the battery cell or the battery pack is formed as the electrode assembly 1 having a different size, the electrode assembly 1 itself is formed to have a step. Thus, when the battery case is formed according to the shape of electrodes and installed in the devices, surplus space, which is not provided in the conventional prismatic or oval battery cell or battery pack, is formed.

When a system component of the device is installed in the surplus space, the system component of the device and the battery cell or the battery pack can be flexibly disposed, enhancing space utilization and reducing an overall thickness or volume of the device to implement a slim design.

MODES FOR CARRYING OUT THE INVENTION

Hereinafter, the present invention will be described in detail through concrete examples. It will, however, be understood that the following examples are provided only for describing embodiments of the present invention and are not intended to limit the present invention to the scope of the following examples.

Manufacturing Example 1: Positive Electrode A $LiCoO_2$ was used as a positive electrode active material and polyvinylidene fluoride (PVDF) was used as a binder, the positive electrode active material and the binder were dissolved in N-methyl-2-pyrrolidone (NMP) and then mixed to prepare a positive electrode paste. The positive electrode paste was coated on both surfaces of an aluminum foil collector having a thickness of 15 μm, dried in an oven at 150° C., and pressed to manufacture a positive electrode A. The manufactured positive electrode A had a thickness of 100 μm, a porosity of 21%, and a reversible capacitance of 335 mAh.

Manufacturing Example 2: Positive Electrode B

A positive electrode B was manufactured using the same method as that in Manufacturing Example 1 except that the thickness of the positive electrode became 110 μm. The manufactured positive electrode B had a thickness of 110 μm, a porosity of 21%, and a reversible capacitance of 375 mAh.

Manufacturing Example 3: Negative Electrode A

A blend material of natural graphite and artificial graphite was used as a negative electrode active material, and styrene-butadiene rubber (SBR) and carboxymethyl cellulose (CMC) carbon were used as a binder. The negative electrode active material and the binder were dissolved in distilled water and mixed to prepare a negative electrode paste. After the negative electrode paste thus obtained was coated on both surfaces of a copper foil collector having a thickness of 10 μm, the copper foil collector coated with the paste was thermally treated in an oven at 100° C., and pressed to manufacture a negative electrode A. The manufactured negative electrode A had a thickness of 105 μm, a porosity of 27%, and a reversible capacitance of 348 mAh.

Manufacturing Example 4: Negative Electrode B

A negative electrode B was manufactured using the same method as that in Manufacturing Example 3 except that the thickness of the negative electrode became 108 μm. The manufactured negative electrode B had a thickness of 108 μm, a porosity of 27%, and a reversible capacitance of 359 mAh.

Manufacturing Example 5: Negative Electrode C

A negative electrode C was manufactured using the same method as that in Manufacturing Example 3 except that the thickness of the negative electrode became 118.8 μm. The manufactured negative electrode C had a thickness of 118.8 μm, a porosity of 27%, and a reversible capacitance of 400 mAh.

Manufacturing Example 6: Negative Electrode D

A negative electrode D was manufactured using the same method as that in Manufacturing Example 3 except that the thickness of the negative electrode became 90 μm. The manufactured negative electrode D had a thickness of 90 μm, a porosity of 27%, and a reversible capacitance of 294 mAh.

Manufacturing Example 7: Negative Electrode E

A negative electrode E was manufactured using the same method as that in Manufacturing Example 3 except that the thickness of the negative electrode became 140 μm. The manufactured negative electrode C had a thickness of 140 μm, a porosity of 27%, and a reversible capacitance of 465 mAh.

Example 1

A small area electrode unit which was manufactured by cutting positive electrode A and negative electrode A to have a size of 80 mm×120 mm, interposing a separator therebetween and stacking the positive electrode A, the separator, and the negative electrode A was stacked on a large area electrode unit which was manufactured by cutting positive electrode A and negative electrode A to have a size of 100 mm×150 mm, interposing a separator therebetween and stacking the positive electrode A, the separator, and the negative electrode A to manufacture an electrode assembly.

Example 2

A small area electrode unit which was manufactured by cutting positive electrode A and negative electrode B to have a size of 80 mm×120 mm, interposing a separator therebetween and stacking the positive electrode A, the separator, and the negative electrode B was stacked on a large area electrode unit which was manufactured by cutting positive electrode A and negative electrode A to have a size of 100 mm×150 mm, interposing a separator therebetween and stacking the positive electrode A, the separator, and the negative electrode A to manufacture an electrode assembly.

Comparative Example 1

A small area electrode unit which was manufactured by cutting positive electrode B and negative electrode C to have a size of 80 mm×120 mm, interposing a separator therebetween and stacking the positive electrode A, the separator, and the negative electrode B was stacked on a large area electrode unit which was manufactured by cutting positive electrode A and negative electrode B to have a size of 100 mm×150 mm, interposing a separator therebetween and stacking the positive electrode A, the separator, and the negative electrode B to manufacture an electrode assembly.

Comparative Example 2

An electrode unit which was manufactured by cutting positive electrode A and negative electrode A to have a size of 80 mm×120 mm, interposing a separator therebetween and stacking the positive electrode A, the separator, and the negative electrode A was stacked on an electrode unit which was manufactured by cutting positive electrode A and negative electrode D to have a size of 100 mm×150 mm, interposing a separator therebetween and stacking the positive electrode A, the separator, and the negative electrode D to manufacture an electrode assembly.

The thickness variation ratio of the electrode assembly was calculated by measuring a total thickness of the electrode assembly whenever a single charge and discharge cycle was completed.

Figure 11:
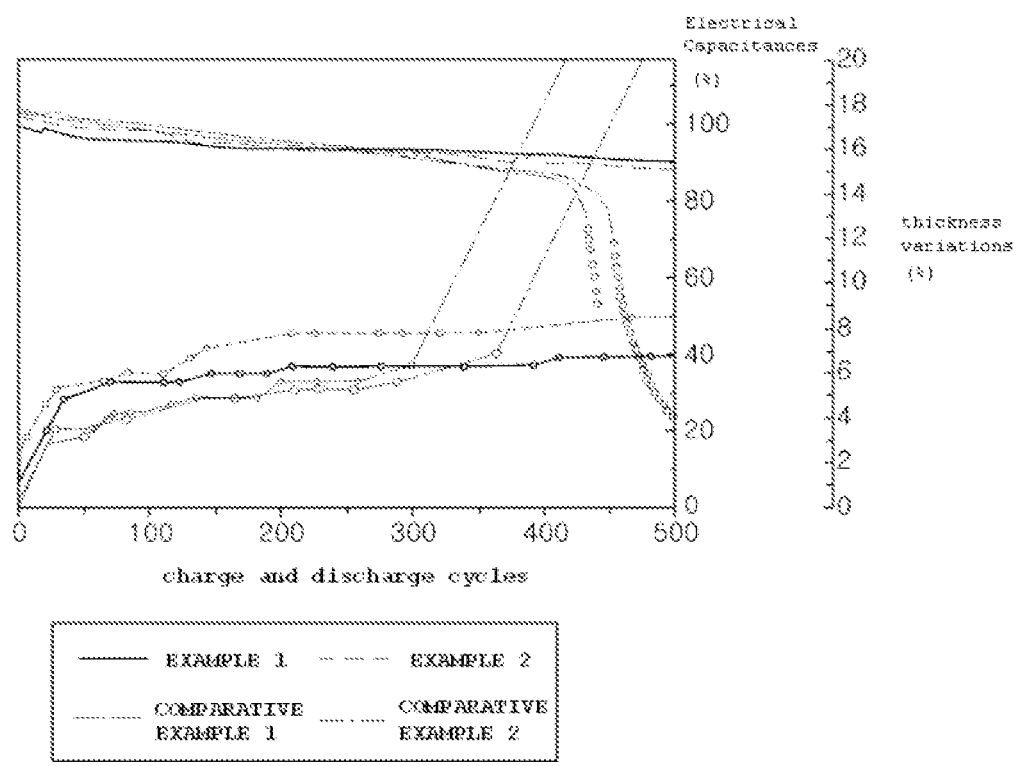
FIG. 11 is a graph showing an electrical capacitance and a thickness variation ratio after 500 charge and discharge cycles of electrode assemblies of Examples 1 and 2 and Comparative Examples 1 and 2.

Measurement results are shown in FIG. 11. As shown in FIG. 11, it may be seen that the electrode assemblies of Examples 1 and 2 manufactured according to the present invention have superior electrical capacitances not less than 80% even after 500 charge and discharge cycles, as compared to the electrical capacitance after discharging single charge and discharge cycle, and a thickness variation ratio of not more than 10%, whereas the electrode assemblies of Comparative Examples 1 and 2 experience abrupt electrical capacitance variation and thickness variation between 400 cycles and 500 cycles.

Experimental Example 2

A small area electrode unit was manufactured by respectively cutting positive electrode A and negative electrode E to have a size of 80 mm×120 mm, interposing a separator and stacking the positive electrode A, the separator and the negative electrode E.

Then, negative electrodes 1 to 8 were manufactured using the same method as that in Manufacturing Example 3 except that the thickness of the negative electrode was changed as shown in Table 2. Reversible capacitances of the manufactured negative electrodes 1 to 8 are found on Table 2. Then, large area electrode units 1 to 8 were manufactured by respectively cutting positive electrode A and negative electrodes 1 to 8 to have a size of 100 mm×150 mm, interposing a separator and stacking the positive electrode A, the separator and the negative electrodes 1 to 8.

TABLE 1

| Item | Large area electrode unit | | | Small area electrode unit | | | N/P thickness ratio at interface | N/P reversible capacitance ratio at interface |
|---|---|---|---|---|---|---|---|---|
| | Positive electrode | Negative electrode | N/P thickness ratio | Positive electrode | Negative electrode | N/P thickness ratio | | |
| Example 1 | A | A | 1.05 | A | A | 1.05 | 1.05 | 1.03 |
| Example 2 | A | A | 1.05 | A | B | 1.08 | 1.05 | 1.03 |
| Comp. Example 1 | A | B | 1.08 | B | D | 1.08 | 0.98 | 0.957 |
| Comp. example 2 | A | D | 0.90 | A | A | 1.05 | 0.90 | 0.878 |

Experimental Example 1

Electrical Capacitances and thickness variations of the electrode assemblies which were manufactured by Examples 1 and 2 and Comparative Examples 1 and 2 when the electrode assemblies were charged and discharged 500 times were measured.

At this time, electrical capacitances were measured under the following charge and discharge conditions, and a pause of 10 minutes was provided between charge and discharge cycles.

(1) Charging condition: After a battery was charged to 4.2V or 4.35V in a constant current mode of 1 C, the constant current mode was converted to a constant voltage mode, and the charging was completed after current flowed until the amount of charged current became 1/20 of a minimum capacitance of the battery.

(2) Discharge condition: A discharge current of 1 C flowed in the constant current mode, and the discharge was completed when the voltage reached 3V.

After that, the small area electrode unit was stacked on the large area electrode units 1 to 8, respectively, to manufacture electrode assemblies 1 to 8.

TABLE 2

| Item | Large area negative electrode | Thickness of negative electrode (μm) | Porosity (%) | Reversible Capacitance (mAh) | Reversible Capacitance ratio at interface | Thickness ratio at interface |
|---|---|---|---|---|---|---|
| Electrode assembly 1 | Negative electrode 1 | 40 | 27 | 105 | 0.31 | 0.4 |
| Electrode assembly 2 | Negative electrode 2 | 50 | 27 | 141 | 0.42 | 0.5 |

TABLE 2-continued

| Item | Large area negative electrode | Thickness of negative electrode (μm) | Porosity (%) | Reversible Capacitance (mAh) | Reversible Capacitance ratio at interface | Thickness ratio at interface |
|---|---|---|---|---|---|---|
| Electrode assembly 3 | Negative electrode 3 | 80 | 27 | 251 | 0.75 | 0.8 |
| Electrode assembly 4 | Negative electrode 4 | 110 | 27 | 360 | 1.07 | 1.1 |
| Electrode assembly 5 | Negative electrode 5 | 140 | 27 | 465 | 1.39 | 1.4 |
| Electrode assembly 6 | Negative electrode 6 | 170 | 27 | 574 | 1.71 | 1.7 |
| Electrode assembly 7 | Negative electrode 7 | 200 | 27 | 682 | 2.04 | 2.0 |
| Electrode assembly 8 | Negative electrode 8 | 220 | 27 | 753 | 2.25 | 2.2 |

After the electrode assemblies manufactured as above were charged and discharged in a single cycle under the following charging conditions and the discharging conditions, electrical capacitances and voltages were measured and the measured electrical capacitances were multiplied by voltages to calculate electrical energies. Then, the calculated electrical energy values were divided by the volumes of the electrode assemblies to calculate energy densities per unit volume.

(1) Charging conditions: After a battery was charged to 4.2V or 4.35V in a constant current mode of 1 C, the constant current mode was converted to a constant voltage mode, and the charging was completed after current flowed until the amount of charged current became 1/20 of a minimum capacitance of the battery.

(2) Discharging conditions: A discharge current of 1 C flowed in the constant current mode, and the discharging was completed when the voltage reached 3V.

A pause time of 10 minutes was given between a single charge and discharge cycle.

Figure 12:
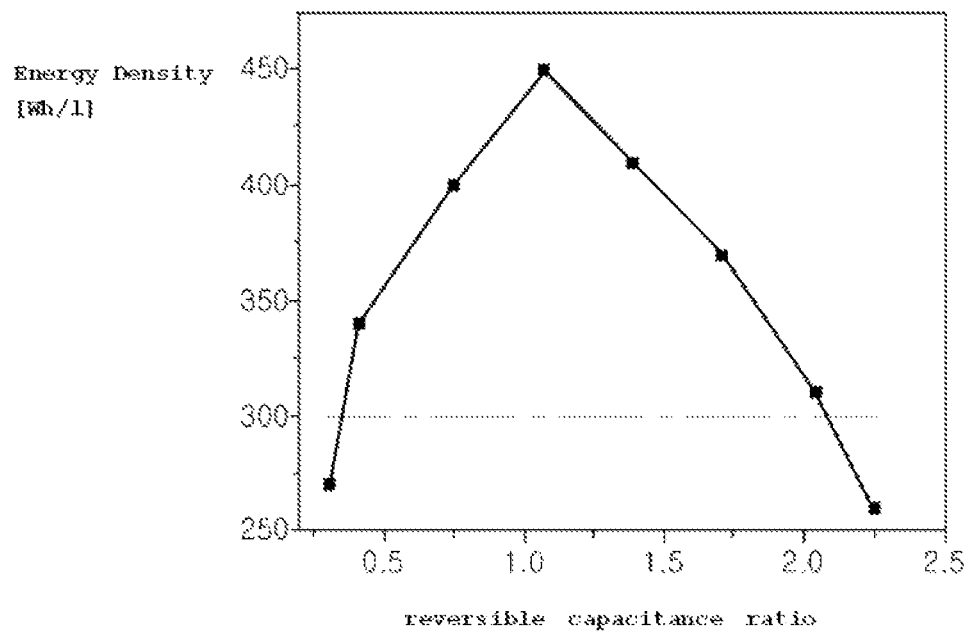
FIG. 12 is a graph showing an energy density variation with a reversible capacitance ratio of a negative electrode to a positive electrode at an interface between electrode units.
Figure 13:
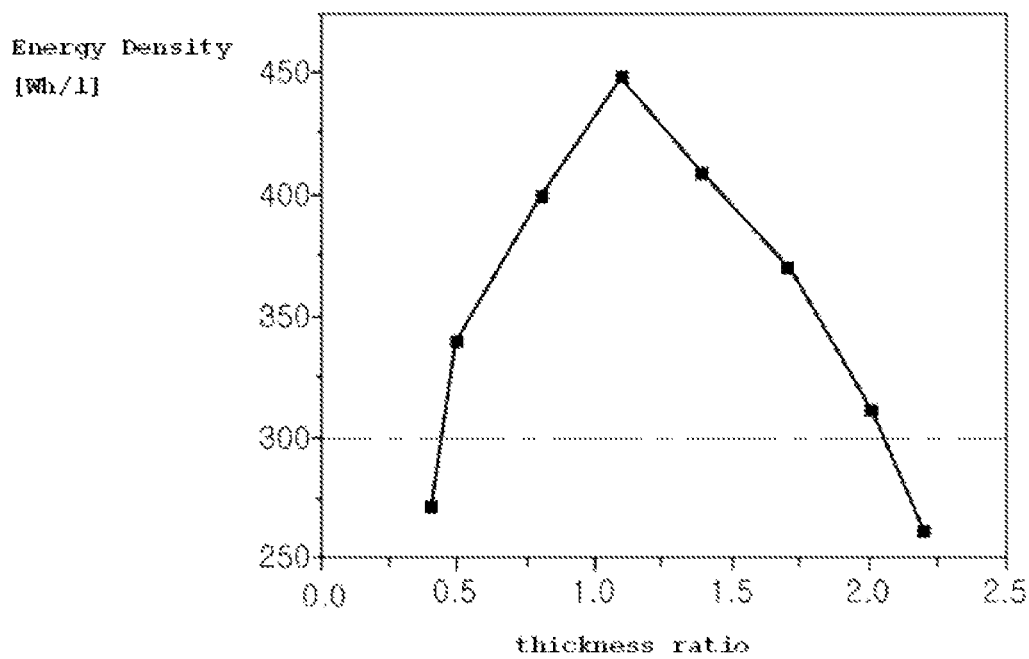
FIG. 13 is a graph showing an energy density variation with a thickness ratio of negative electrode/positive electrode at an interface between electrode units.

FIG. 12 is a graph showing energy densities with reversible capacitance ratios per unit area of negative electrodes and positive electrodes at an interface between electrode units based on the measured values, and FIG. 13 is a graph showing energy densities with thickness ratios per unit area of negative electrodes and positive electrodes at an interface between electrode units.

From FIG. 12, it may be seen that the energy density per unit volume is very high when the reversible capacitance ratio per unit area of the negative electrode to the positive electrode at the interface between the electrode units is in a range of 1 to 1.5, and particularly, 1 to 1.2. Meanwhile, as shown in FIG. 12, even when the reversible capacitance ratio per unit area at the interface is not more than 1, a commercially available energy density may be obtained, but as reviewed in Experimental Example 1, since the electrical capacitance is abruptly reduced and the thickness varies abruptly while the charge and discharge cycles are repeated, that case is not suitable for commercialization.

Also, from FIG. 13, it may be seen that when the thickness ratio of the negative to the positive electrode at the interface between the electrode units is within a range of 0.5 to 2, the energy density per unit volume is 300 Wh/l or more, a commercially available level, when the thickness ratio at the interface is within a range of 0.6 to 1.9, the energy density per unit volume is 350 Wh/l or more and is very excellent, and when the thickness ratio at the interface is within a range of 0.8 to 1.5, particularly, 1.0 to 1.5, the energy density per unit volume is 400 Wh/l or more and is very excellent.

The invention claimed is:

1. An electrode assembly comprising a combination of two or more types of electrode units having different areas, the electrode units being stacked so as to form a stepped portion therebetween,
   wherein a positive electrode and a negative electrode are formed to face each other at an interface between the electrode units, and
   Equation 4 is satisfied:

$$dN_n/dP_n \leq dN_n/dP_{n+1}, \quad \text{Equation 4:}$$

where n is an integer not less than 1,
   $dN_n$ is a thickness of the negative electrode of the electrode unit that is the n-th largest in area,
   $dP_n$ is a thickness of the positive electrode of the electrode unit that is the n-th largest in area, and
   $dP_{n+1}$ is a thickness of the positive electrode of the electrode unit that is the (n+1)th largest in area.

2. An electrode assembly of claim 1, wherein Equation 4-1 is satisfied:

$$0.5 \leq dN_n/dP_n \leq dN_n/dP_{n+1} \leq 2 \quad \text{Equation 4-1:}$$

where n is an integer not less than 1,
   $dN_n$ is a thickness of a negative electrode of an electrode unit that is the n-th largest in area,
   $dP_n$ is a thickness of a positive electrode of an electrode unit that is the n-th largest in area, and
   $dP_{n+1}$ is a thickness of a positive electrode of the electrode unit that is the (n+1)th largest in area.

3. The electrode assembly of claim 1, wherein the positive electrode of the electrode unit having a relatively small area faces the negative electrode of the electrode unit having a relatively large area at the interface between the electrode units having different areas.

4. The electrode assembly of claim 1, wherein
   when 500 charge and discharge cycles have been performed at 25° C. under charging conditions (A) and a discharging conditions (B), an electrical capacitance of the electrode assembly is 60% or more of an electrical capacitance after a single charge and discharge cycle, and a total thickness variation ratio of the electrode assembly is 15% or less:
   charging conditions (A): after a battery is charged to 4.2V or 4.35V in a constant current mode of 1 C, the constant current mode is converted to a constant voltage mode, and the charging is completed after current flows until the amount of charged current becomes 1/20 of a minimum capacitance of the battery; and
   discharging conditions (B): a discharge current of 1 C flows in the constant current mode, and the discharge is completed when the voltage reaches 3V.

5. The electrode assembly of claim 1, wherein a ratio of a reversible capacitance per unit area of the negative electrode to a reversible capacitance per unit area of the positive electrode facing the negative electrode at the interface between the electrode units having different areas is not less than 1.

6. The electrode assembly of claim 1, wherein Equation 5 is satisfied:

$$dN_n/dP_n \leq dN_n/dP_{n+1} \leq dN_{n+1}/dP_{n+1} \leq dN_{n+1}/dP_{n+2} \quad \text{Equation 5:}$$

where n is an integer not less than 1,
$dN_n$ is a thickness of the negative electrode of the electrode unit that is the n-th largest in area,
$dN_{n+1}$ is a thickness of the negative electrode of the electrode unit that is the (n+1)th largest in area,
$dP_n$ is a thickness of the positive electrode of the electrode unit that is the n-th largest in area,
$dP_{n+1}$ is a thickness of the positive electrode of the electrode unit that is the (n+1)th largest in area, and
$dP_{n+2}$ is a thickness of the positive electrode of the electrode unit that is the (n+2)th largest in area.

7. The electrode assembly of claim 1, wherein Equation 5-1 is satisfied:

$$0.5 \leq dN_n/dP_n \leq dN_n/dP_{n+1} \leq dN_{n+1}/dP_{n+1} \leq dN_{n+1}/dP_{n+2} \leq 2 \quad \text{Equation 5-1:}$$

where n is an integer not less than 1,
$dN_n$ is a thickness of the negative electrode of the electrode unit that is the n-th largest in area,
$dN_{n+1}$ is a thickness of the negative electrode of the electrode unit that is the (n+1)th largest in area,
$dP_n$ is a thickness of the positive electrode of the electrode unit that is the n-th largest in area,
$dP_{n+1}$ is a thickness of the positive electrode of the electrode unit that is the (n+1)th largest in area, and
$dP_{n+2}$ is a thickness of the positive electrode of the electrode unit that is the (n+2)th largest in area.

8. The electrode assembly of claim 6, wherein the electrode unit that is the (n+2)th largest in area is disposed between the electrode unit that is the n-th largest in area and the electrode unit that is (n+1)th largest in area, and
Equation 6 is satisfied, $$dN_n/dP_{n+2} \leq dN_{n+1}/dP_{n+2} \quad \text{Equation 6:}$$

where n is an integer not less than 1,
$dN_n$ is a thickness of the negative electrode of the electrode unit that is the n-th largest in area,
$dN_{n+1}$ is a thickness of the negative electrode of the electrode unit that is the (n+1)th largest in area,
$dP_{n+1}$ is a thickness of the positive electrode of the electrode unit that is the (n+1)th largest in area, and
$dP_{n+2}$ is a thickness of the positive electrode of the electrode unit that is the (n+2)th largest in area.

9. The electrode assembly of claim 1, wherein the electrode assembly comprises a combination of three or more types of electrode unit having different areas, and
the ratios of the reversible capacitances per unit area of the negative electrodes to the reversible capacitances per unit area of the positive electrodes facing the negative electrodes at the interface between the electrode units are the same as each other or increase as the contact area between the electrode units is reduced.

10. The electrode assembly of claim 1, wherein the positive electrode has a porosity in a range of 10% to 30%, and
the negative electrode has a porosity in a range of 15% to 50%.

11. The electrode assembly of claim 1, wherein the electrode unit comprises: one or more single electrodes; one or more unit cells including at least one positive electrode, at least one negative electrode, and at least one separator; or any combination thereof.

12. The electrode assembly of claim 11, wherein the unit cell is selected from the group consisting of a jelly-roll type unit cell, a stacked-type unit cell, a laminated-and-stacked type unit cell and a stacked-and-folded-type unit cell.

13. The electrode assembly of claim 1, wherein the electrode assembly has a structure in which some or all of the single electrode and the unit cells constituting the electrode units are wrapped with a long sheet-type separation film.

14. The electrode assembly of claim 11, wherein polarities of electrodes disposed on both outermost surfaces of the unit cell are the same.

15. The electrode assembly of claim 11, wherein polarities of electrodes disposed on both outermost surfaces of the unit cell are different.

16. The electrode assembly of claim 1, wherein a section of the electrode unit has a quadrangular shape, a quadrangular-like shape with at least one corner having a curved shape, or a shape with at least one or more sides having a curved shape.

17. The electrode assembly of claim 1, wherein the electrode assembly includes a combination of electrode units having different sectional shapes.

18. The electrode assembly of claim 1, wherein the electrode assembly includes a combination of electrode units having the same sectional shape.

19. The electrode assembly of claim 1, wherein the electrode units include one or more electrode tabs, and the electrode tabs having the same polarity are connected.

20. The electrode assembly of claim 19, wherein the electrode tabs have different sizes.

21. The electrode assembly of claim 1, wherein the electrode units are stacked to have an arrangement in which the areas of the electrode units are reduced upwardly.

22. The electrode assembly of claim 1, wherein the electrode units are stacked to have an arrangement in which the areas of the electrode units are increased upwardly.

23. The electrode assembly of claim 1, wherein the electrode units are stacked such that an electrode unit having the largest area is arranged in a middle layer of the electrode assembly.

24. The electrode assembly of claim 1, wherein the electrode units are stacked to have an arrangement in which central points of the respective electrode units in the plane direction are consistent.

25. The electrode assembly of claim 1, wherein the electrode units are stacked to have an arrangement in which the central points of the respective electrode units in the plane direction are spaced apart at certain intervals.

26. The electrode assembly of claim 1, wherein the electrode units are stacked to have an arrangement in which one corners of the respective electrode units are consistent.

27. A battery cell in which the electrode assembly of claim 1 is installed in a battery case.

28. The battery cell of claim 27, wherein the battery case is formed to have a shape corresponding to a shape of the electrode assembly.

29. A device comprising one or more of the battery cells of claim 27.

30. The device of claim 27, wherein a system component of the device is positioned in surplus space within the battery cell.

31. The electrode assembly according to claim 1, wherein thickness of the respective electrode units are different.

* * * * *